(12) United States Patent
Bhattad et al.

(10) Patent No.: US 11,394,505 B2
(45) Date of Patent: Jul. 19, 2022

(54) SYSTEM INFORMATION PERFORMANCE ENHANCEMENTS

(71) Applicant: QUALCOMM Incorporated, San Diego, CA (US)

(72) Inventors: Kapil Bhattad, Bangalore (IN); Alberto Rico Alvarino, San Diego, CA (US); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/976,712

(22) Filed: May 10, 2018

(65) Prior Publication Data
US 2018/0331802 A1    Nov. 15, 2018

(30) Foreign Application Priority Data

May 13, 2017  (IN) .............................. 201741016858

(51) Int. Cl.
*H04L 5/00* (2006.01)
*H04W 36/00* (2009.01)
(Continued)

(52) U.S. Cl.
CPC .......... *H04L 5/0048* (2013.01); *H04L 1/0041* (2013.01); *H04L 1/0047* (2013.01);
(Continued)

(58) Field of Classification Search
None
See application file for complete search history.

(56) References Cited

U.S. PATENT DOCUMENTS

2011/0164707 A1* 7/2011 Luo ........................ H04L 1/0045
375/341
2011/0228883 A1* 9/2011 Liu ........................ H04L 1/0045
375/341
(Continued)

FOREIGN PATENT DOCUMENTS

JP        2017079477 A      4/2017
WO    WO-2016173922 A1 *  11/2016   .......... H03M 13/413

OTHER PUBLICATIONS

Ericsson: "Reduced System Acquisition Time for NB-IoT", 3GPP Draft; R1-1706894—Reduced System Acquisition Time for NB-IoT, 3rd Generation Partnership Project (3GPP), Mobile Competence Centre; 650, Route Des Lucioles; F-06921, Sophia-Antipolis Cedex; France, vol. RAN No. Hangzhou, China; May 15, 2017-May 19, 2017 May 6, 2017, XP051261553, Retrieved from the Internet: URL:http://www.3gpp.org/ftp/tsg_ran/WG1_RL1/TSGR1_89/ Docs/ [retrieved on May 6, 2017], 6 pages.
(Continued)

*Primary Examiner* — Peter Chen
*Assistant Examiner* — Jeff Banthrongsack
(74) *Attorney, Agent, or Firm* — Haynes and Boon, LLP

(57) ABSTRACT

Wireless communications systems and methods related to system information communications and decoding are provided. In one embodiment, a wireless communication device receives one or more known bits. The wireless communication device receives a first encoded information block. The wireless communication device decodes the first encoded information block to generate a first information block based on the one or more known bits. In one embodiment, a wireless communication device receives a first encoded information block including a first bit pattern. The wireless communication device receives a second encoded information block including a second bit pattern. The wireless communication device jointly decodes the first encoded
(Continued)

information block and the second encoded information block based on an assumption that a difference between the first bit pattern and the second bit pattern is within a subset of a plurality of bit-change patterns.

32 Claims, 14 Drawing Sheets

(51) Int. Cl.
*H04W 48/16* (2009.01)
*H04W 48/12* (2009.01)
*H04L 1/00* (2006.01)
*H04W 36/08* (2009.01)

(52) U.S. Cl.
CPC ....... *H04L 1/0072* (2013.01); *H04W 36/0005* (2013.01); *H04W 36/0072* (2013.01); *H04W 36/08* (2013.01); *H04W 48/12* (2013.01); *H04W 48/16* (2013.01); *H04L 1/00* (2013.01); *H04L 5/0053* (2013.01)

(56) References Cited

U.S. PATENT DOCUMENTS

2014/0301296 A1 10/2014 Vos et al.
2015/0016331 A1 1/2015 Kim et al.
2015/0208290 A1 7/2015 Seo et al.

OTHER PUBLICATIONS

International Search Report and Written Opinion—PCT/US2018/032415—ISA/EPO—Sep. 21, 2018.

Partial International Search Report—PCT/US2018/032415—ISA/EPO—Aug. 8, 2018.

Taiwan Search Report—TW107116093—TIPO—Nov. 4, 2021.

* cited by examiner

SYSTEM INFORMATION PERFORMANCE ENHANCEMENTS

CROSS REFERENCE TO RELATED APPLICATIONS

The present application claims priority to and the benefit of India Patent Application No. 201741016858, filed May 13, 2017, which is hereby incorporated by reference in its entirety as if fully set forth below and for all applicable purposes.

TECHNICAL FIELD

The technology discussed in this disclosure relates generally to wireless communication systems, and more particularly to systems and methods that allow wireless communication devices of a radio access network (RAN) to have low latency communication and reduced power consumption. Certain embodiments can enable and provide solutions and techniques for efficient physical broadcast channel decoding (e.g., at user equipment devices (UEs)) and communication and/or signaling (e.g., by base stations (BSs)) to facilitate efficient decoding.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of base stations (BSs), each simultaneously supporting communication for multiple communication devices, which may be otherwise known as user equipment (UE).

To meet the growing demands for expanded connectivity, wireless communication technologies or radio access technologies are advancing from the LTE technology to a next generation new radio (NR) technology. One technique for expanding connectivity may be to extend the frequency operation range to higher frequencies since the lower frequencies are becoming over-crowded. For example, LTE may operate between a low-frequency range (e.g., below 1 gigahertz (GHz)) to a mid-frequency range (e.g., between about 1 GHz to about 3 GHz) and the next generation NR may operate in a high-frequency range (e.g., between about 3 GHz to about 30 GHz).

In the next generation NR, the payload size may grow and may lead to decoding complexities that can cause latency issues and may drain more power from the UE. Also, channel estimation during a handover between two cells in a low signal to noise ratio environment may cause latency issues.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Wireless communication devices connected to a wireless communications system may continuously communicate with the wireless communication system to synchronize with the wireless communications system. As part of the synchronization process, wireless communication devices may continuously receive master information blocks from a physical broadcast channel. A master information block may be encoded and thus the wireless communication devices may be required to decode the content of the master information block and then may use the information in the decoded master information block to synchronize with the physical broadcast channel. Decoding the signal transmitted by the physical broadcast channel, i.e., decoding the master information blocks, may cause latency and may consume a great amount of power.

Embodiments of the present disclosure provide mechanisms for efficient physical broadcast channel or master information block decoding. For example, a UE may perform the decoding based on known bits in the master information blocks. Alternatively, a UE may perform joint decoding across multiple master information blocks based on potential bit pattern changes and may use a hypothesis to reduce the decoding. In addition, the disclosed embodiments provide mechanisms to facilitate channel estimation during a handover between two cells in a low signal-to-noise ratio environment.

For example, in an aspect of the disclosure, a method of wireless communication can include receiving, by a wireless communication device, one or more known bits. The method can also include receiving, by the wireless communication device, a first encoded information block and decoding, by the wireless communication device, the first encoded information block. Decoding can generate a first information block based on the one or more known bits.

In an additional aspect of the disclosure, a method of wireless communication can include receiving, by a wireless communication device, a first encoded information block including a first bit pattern. The method can also include receiving, by the wireless communication device, a second encoded information block including a second bit pattern and jointly decoding, by the wireless communication device, the first encoded information block and the second encoded information block. Joint decoding can be based on an assumption that a difference between the first bit pattern and the second bit pattern is within a subset of a plurality of bit-change patterns.

In an additional aspect of the disclosure, a method of wireless communication can include generating, by a first wireless communication device, a first information block based on one or more known bits. The method can also include encoding, by the first wireless communication device, the first information block to form a first encoded information block and transmitting, by the first wireless communication device to a second wireless communication device, the first encoded information block. The method can also include transmitting, by the first wireless communication device to the second wireless communication device, the one or more known bits to enable decoding of the first encoded information block at the second wireless communication device.

In an additional aspect of the disclosure, a method of wireless communication can include receiving, by a user equipment (UE) from a first base station of a first cell, a handover message including configuration information for a second cell. The handover message can correspond to a handover between the first cell and the second cell. The method can also include receiving, by the UE from a second base station of the second cell, one or more reference signals in one or more subframes based on the received configuration information. The method can also include performing, by the UE, channel estimation based on the one or more received reference signals and the received configuration information.

In an additional aspect of the disclosure, an apparatus can include a transceiver configured to receive one or more known bits and a first encoded information block. The apparatus can also include a processor in communication with the receiver and configured to decode the first encoded information block. Decoding can generate a first information block based on the one or more known bits.

In an additional aspect of the disclosure, an apparatus can include a transceiver configured to receive a first encoded information block including a first bit pattern and a second encoded information block including a second bit pattern. The apparatus can also include a processor configured to jointly decode the first encoded information block and the second encoded information block. Joint decoding can be based on an assumption that a difference between the first bit pattern and the second bit pattern is within a subset of a plurality of bit-change patterns.

In an additional aspect of the disclosure, an apparatus can include a processor configured to generate a first information block based on one or more known bits. The processor can also be configured to encode the first information block to form a first encoded information block. The apparatus can also include a transceiver configured to transmit, to a second wireless communication device, the first encoded information block. The transceiver can also be configured to transmit, to the second wireless communication device, the one or more known bits to enable decoding of the first encoded information block at the second wireless communication device.

In an additional aspect of the disclosure, an apparatus can include a transceiver configured to receive, from a first base station of a first cell, a handover message including configuration information for a second cell. The handover message can correspond to a handover between the first cell and the second cell. The transceiver can also be configured to receive, from a second base station of the second cell, one or more reference signals in one or more subframes based on the received configuration information. The apparatus can also include a processor configured to perform channel estimation based on the one or more received reference signals and the received configuration information.

Additional aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
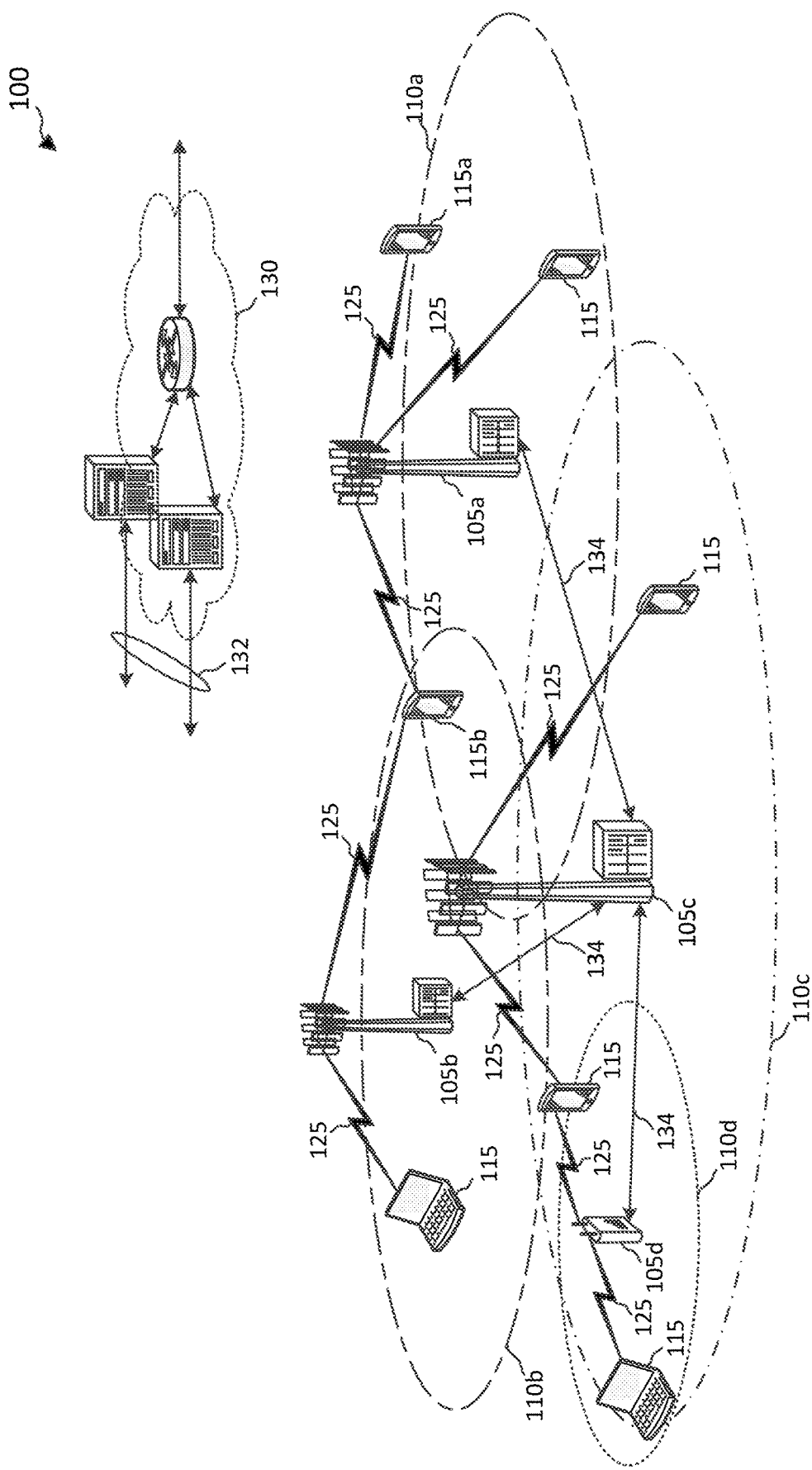
FIG. 1 illustrates a wireless communication network according to some embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as code-division multiple access (CDMA), time-division multiple access (TDMA), frequency-division multiple access (FDMA), orthogonal frequency-division multiple access (OFDMA), single-carrier FDMA (SC-FDMA) and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies, such as a next generation (e.g., $5^{th}$ Generation (5G) operating in mmWave bands) network.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. It is intended that innovations described herein may be practiced in a wide variety of devices, chip-level components, systems, distributed arrangements, end-user devices, etc.

The present disclosure describes mechanisms for efficient physical broadcast channel or master information block decoding. In some examples, a base station may transmit master information blocks periodically in a physical broadcast channel to allow other devices (e.g., user equipment or UEs) to synchronize with the base station. In some examples, the fields of the master information blocks may be divided into two groups of fields. A first group of fields that may change from one period to the next and a second group of fields that may not change from one period to the next and may not change for several periods. In some examples, each field may include one or more bits of data. In some examples, the first group of fields may include a system frame number (SFN) that changes (e.g, increments or decrements) at or for each transmission. Additionally, the base station may encode the master information blocks and thus a UE is required to perform decoding upon reception of the master information blocks.

Decoding as discussed herein can be accomplished and implemented in various manners. In one embodiment, the UE may perform the decoding based on known information bits (e.g., the changing or incrementing of SFN) in the master information blocks, for example, signaled by the BS. In one embodiment, the UE may perform joint decoding across multiple master information blocks based on expected bit changes across consecutive master information blocks. For example, a master information block including an odd SFN is followed by a master information block including an even SFN (this is an example of changes between known or expected states). Similarly, a master information block including an even SFN is followed by a master information block including an odd SFN. The number of bit changes may vary depending on the bit-length of the SFN and whether the transition is from an odd SFN to an even SFN or from an even SFN to an odd SFN. The UE may perform the joint decoding by selecting a hypothesis that can reduce the amount of decoding complexity. In one embodiment, a serving BS may provide a UE with information that can facilitate handover and reduce the handover latency. The information may be associated with reference signal transmissions and/or SFN in a target cell for the handover.

FIG. 1 illustrates a wireless communication network 100 according to some embodiments of the present disclosure. The network 100 includes BSs 105, UEs 115, and a core network 130. The network 100 may be a cellular network or a non-cellular wireless network. For example, the network 100 may be a LTE network, a LTE-A network, a millimeter wave (mmW) network, a new radio (NR) network, a 5G network, a P2P network, mesh network, D2D where devices communication with each other, or any other successor network to LTE. Alternatively, the network 100 may be a unified network supporting multiple radio access technologies (RATs), such as both LTE and NR. A BS 105 may be a station that communicates with the UEs 115 and may also be referred to as a base transceiver station, a node B, an Evolved Node B (eNodeB) or a next Generation Node B (gNB), an access point, and the like.

The BSs 105 may wirelessly communicate with the UEs 115 via one or more BS antennas. Each BS 105 may provide communication coverage for a respective geographic coverage area 110. In 3GPP, the term "cell" can refer to this particular geographic coverage area of a BS and/or a BS subsystem serving the coverage area, depending on the context in which the term is used. In this regard, a BS 105 may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell may generally cover a relatively smaller geographic area and may allow unrestricted access by UEs with service subscriptions with the network provider. A femto cell may also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a pico cell may be referred to as a pico BS. A BS for a femto cell may be referred to as a femto BS or a home BS. In the example shown in FIG. 1, the BSs 105a, 105b and 105c are examples of macro BSs for the coverage areas 110a, 110b and 110c, respectively. The BSs 105d is an example of a pico BS or a femto BS for the coverage area 110d. As will be recognized, a BS 105 may support one or multiple (e.g., two, three, four, and the like) cells.

Communication links 125 shown in the network 100 may include uplink (UL) transmissions from a UE 115 to a BS 105, or downlink (DL) transmissions, from a BS 105 to a UE 115. The UEs 115 may be dispersed throughout the network 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, an entertainment device, medical device, wearable device, industrial equipment, or the like.

The BSs 105 may communicate with the core network 130 and with one another. The core network 130 may provide user authentication, access authorization, tracking, Internet Protocol (IP) connectivity, and other access, routing, or mobility functions. At least some of the BSs 105 (e.g., which may be an example of an evolved NodeB (eNB) or an access node controller (ANC)) may interface with the core network 130 through backhaul links 132 (e.g., S1, S2, etc.) and may perform radio configuration and scheduling for communication with the UEs 115. In various examples, the BSs 105 may communicate, either directly or indirectly (e.g., through core network 130), with each other over backhaul links 134 (e.g., X1, X2, etc.), which may be wired or wireless communication links.

Each BS 105 may also communicate with a number of UEs 115 through a number of other BSs 105, where the BS 105 may be an example of a smart radio head. In alternative configurations, various functions of each BS 105 may be distributed across various BSs 105 (e.g., radio heads and access network controllers) or consolidated into a single BS 105.

In some implementations, the network 100 utilizes orthogonal frequency division multiplexing (OFDM) on the downlink and single-carrier frequency division multiplexing (SC-FDM) on the UL. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. The system bandwidth may also be partitioned into subbands.

In an embodiment, the BSs 105 can assign or schedule transmission resources (e.g., in the form of time-frequency resource blocks) for DL and UL transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes, for example, about 10. Each subframe can be divided into slots, for example, about 2. In a frequency-division duplexing (FDD) mode, simultaneous UL and DL transmissions may occur in different frequency bands. For example, each subframe includes a UL subframe in a UL frequency band and a DL subframe in a DL frequency band. In a time-division duplexing (TDD) mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational bandwidth or frequency band, each positioned at a pre-defined time and a pre-defined frequency. For example, a BS 105 may transmit cell-specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some embodiments, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than the UL communication. A UL-centric subframe may include a longer duration for UL communication than the DL communication.

In an embodiment, a UE 115 attempting to access the network 100 may perform an initial cell search by detecting a primary synchronization signal (PSS) from a BS 105. The PSS may enable synchronization of period timing and may indicate a physical layer identity value. The UE 115 may then receive a secondary synchronization signal (SSS). The SSS may enable radio frame synchronization, and may provide a cell identity value, which may be combined with the physical layer identity value to identify the cell. The SSS may also enable detection of a duplexing mode and a cyclic prefix length. Some systems, such as TDD systems, may transmit an SSS but not a PSS. Both the PSS and the SSS may be located in a central portion of a carrier, respectively. After receiving the PSS and SSS, the UE 115 may receive a master information block (MIB), which may be transmitted in the physical broadcast channel (PBCH).

The MIB may contain information usable by receiving devices for system communications. This information can include, for example, system bandwidth information, a system frame number (SFN), and a Physical Hybrid-ARQ Indicator Channel (PHICH) configuration. After decoding the MIB, the UE 115 may receive one or more system information blocks (SIBs). For example, SIB1 may contain cell access parameters and scheduling information for other SIBs. Decoding SIB1 may enable the UE 115 to receive SIB2. SIB2 may contain radio resource configuration (RRC) configuration information related to random access channel (RACH) procedures, paging, physical uplink control channel (PUCCH), physical uplink shared channel (PUSCH), power control, SRS, and cell barring. After obtaining the MIB and/or the SIBs, the UE 115 can perform random access procedures to establish a connection with the BS 105. After establishing the connection, the UE 115 and the BS 105 can enter a normal operation stage, where operational data may be exchanged.

In some embodiments, the network 100 may be a unified network supporting both LTE and NR. In such embodiments, the network 100 may operate over an LTE spectrum or LTE component carriers and an NR spectrum or NR component carriers. The LTE spectrum may include low-frequency bands that are below 1 GHz and mid-frequency bands that are between about 1 GHz to about 3 GHz. The NR spectrum may include sub-6 GHz frequency bands and millimeter wave bands. The BSs 105 may include LTE BSs and NR BSs. In some embodiments, LTE BSs and NR BSs may be co-located. For example, the BSs 105 may employ the same hardware to implement both LTE and NR by executing different software components or stacks for LTE and NR. In addition, the UEs 115 may include standalone LTE devices and standalone NR devices. Standalone LTE devices support LTE connectivity, but not NR. Conversely, standalone NR devices support NR connectivity, but not LTE. Alternatively, some UEs 115 may support dual LTE-NR connectivity. The communication mechanisms and frequency band plans for the various combinations of connectivity are described in greater detail herein.

Figure 2:
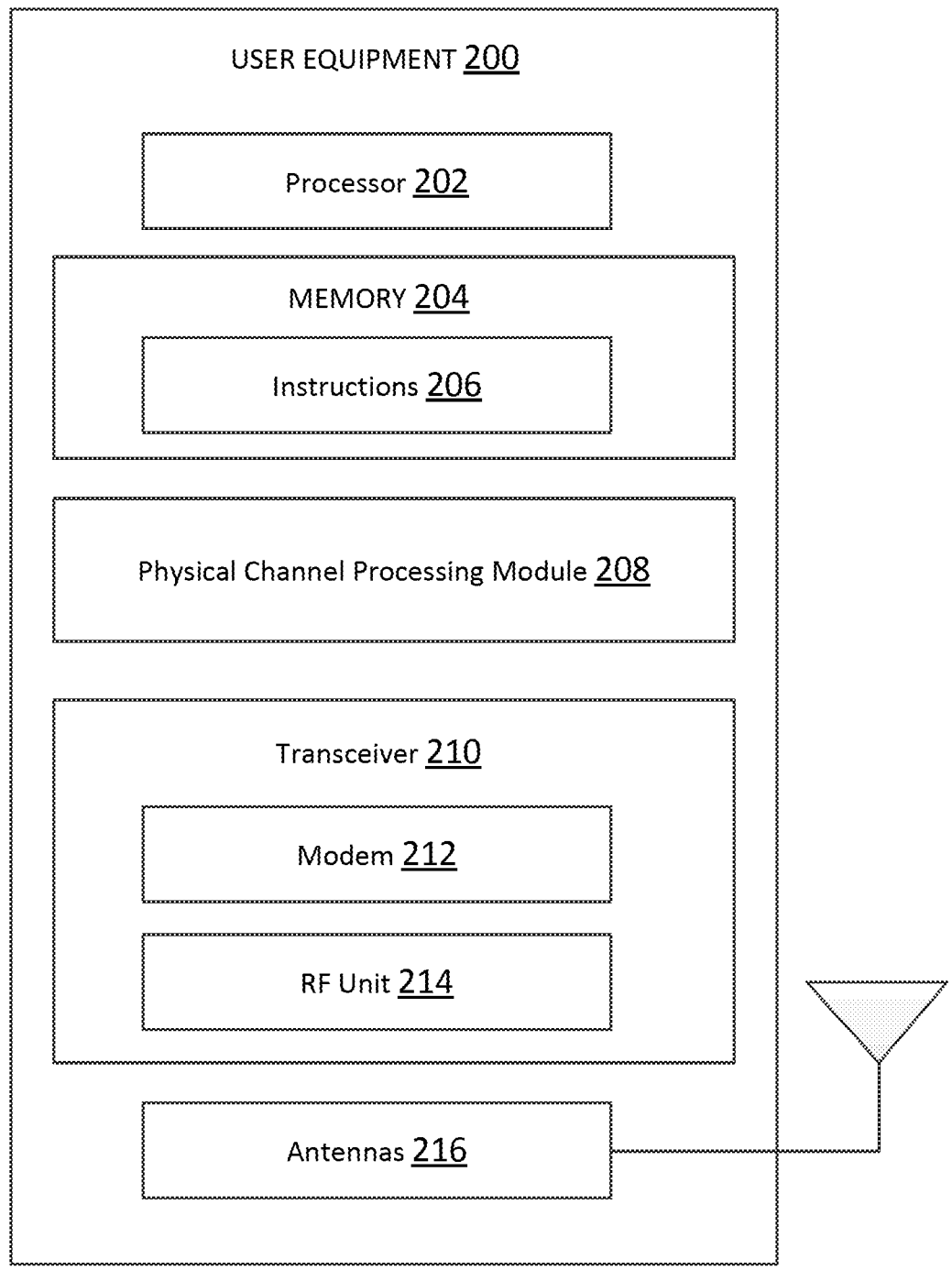
FIG. 2 is a block diagram of an exemplary user equipment (UE) according to some embodiments of the present disclosure.

FIG. 2 is a block diagram of an exemplary wireless communication device 200, e.g., a UE 200, according to some embodiments of the present disclosure. The UE 200 may be a UE 115 as discussed above. As shown, the UE 200 may include a processor 202, a memory 204, a physical channel processing module 208, a transceiver 210 including a modem subsystem 212 and a radio frequency (RF) unit 214, and an antenna 216. These elements may be in direct or indirect communication with each other, for example via one or more buses.

The processor 202 may include a central processing unit (CPU), a digital signal processor (DSP), an application-specific integrated circuit (ASIC), a controller, a field programmable gate array (FPGA) device, another hardware device, a firmware device, or any combination thereof configured to perform the operations described herein. The processor 202 may also be implemented as a combination of computing devices, e.g., a combination of a DSP and a microprocessor, a plurality of microprocessors, one or more microprocessors in conjunction with a DSP core, or any other such configuration.

The memory 204 may include a cache memory (e.g., a cache memory of the processor 202), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 204 includes a non-transitory computer-readable medium. The memory 204 may store instructions 206. The instructions 206 may include instructions that, when executed by the processor 202, cause the processor 202 to perform the operations described herein with reference to the UEs 115 in connection with embodiments of the present disclosure. Instructions 206 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The physical channel processing module 208 may be implemented via hardware, software, or combinations thereof. For example, the physical channel processing module 208 may be implemented as a processor, circuit, and/or instructions 206 stored in the memory 204 and executed by the processor 202. The physical channel processing module 208 may be used for various aspects of the present disclosure. For example, the physical channel processing module 208 is configured to listen to, e.g., monitor, the network for an information block broadcast. The physical channel processing module 208 is further configured to decode an information block, a system information block, a master information block, physical downlink control channel (PDCCH) signals, or physical downlink control shared channel (PDSCH) signals received by the transceiver 210 from the network, e.g., the NR or LTE network. The decoded information block may be used by the processor 202 to perform initialization and synchronization. In some examples, the physical channel processing module 208 may be implemented by the processor 202.

As shown, the transceiver 210 may include the modem subsystem 212 and the RF unit 214. The transceiver 210 can be configured to communicate bi-directionally with other devices, such as the BSs 105. The modem subsystem 212 may be configured to modulate and/or encode the data from the memory 204 and/or the physical channel processing module 208 according to a modulation and coding scheme (MCS), e.g., a low-density parity check (LDPC) coding scheme, a turbo coding scheme, a convolutional coding scheme, a digital beamforming scheme, etc. The RF unit 214 may be configured to process (e.g., perform analog to digital conversion or digital to analog conversion, etc.) modulated/encoded data from the modem subsystem 212 (on outbound transmissions) or of transmissions originating from another source such as a UE 115. The RF unit 214 may be further configured to perform analog beamforming in conjunction with the digital beamforming. Although shown as integrated together in transceiver 210, the modem subsystem 212 and the RF unit 214 may be separate devices that are coupled together at the UE 115 to enable the UE 115 to communicate with other devices.

The RF unit 214 may provide the modulated and/or processed data, e.g. data packets (or, more generally, data messages that may contain one or more data packets and other information), to the antenna 216 for transmission to one or more other devices. This may include, for example, transmission of channel reservation signals according to some embodiments of the present disclosure. The antenna 216 may further receive data messages transmitted from other devices. This may include, for example, reception of channel reservation signals according to embodiments of the present disclosure. The antenna 216 may provide the received data messages for processing and/or demodulation at the transceiver 210. Although FIG. 2 illustrates antenna 216 as a single antenna, antenna 216 may include multiple antennas of similar or different designs in order to sustain multiple transmission links. The RF unit 214 may configure the antenna 216.

Figure 3:
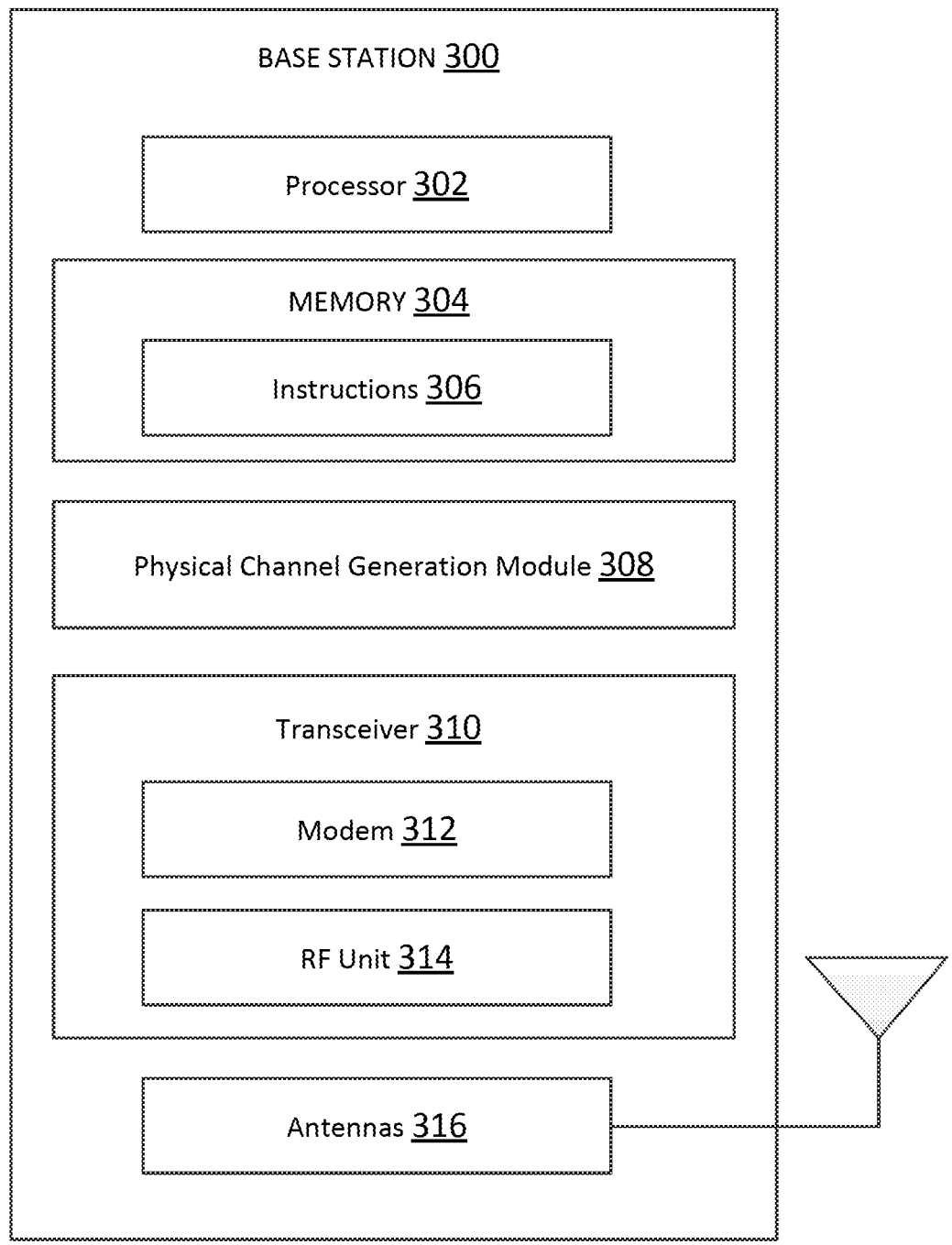
FIG. 3 is a block diagram of an exemplary base station (BS) according to some embodiments of the present disclosure.

FIG. 3 is a block diagram of an exemplary BS 300 according to some embodiments of the present disclosure. The BS 300 may be a BS 105 as discussed above. As shown, the BS 300 may include a processor 302, a memory 304, a physical channel generation module 308, a transceiver 310 including a modem subsystem 312 and a RF unit 314, and an antenna 316. These elements may be in direct or indirect communication with each other, for example via one or more buses.

The processor 302 may have various features as a specific-type processor. For example, these may include a CPU, a DSP, an ASIC, a controller, a FPGA device, another hardware device, a firmware device, or any combination thereof configured to perform the operations described herein. The processor 302 may also be implemented as a combination of computing devices, e.g., a combination of a DSP and a microprocessor, a plurality of microprocessors, one or more microprocessors in conjunction with a DSP core, or any other such configuration.

The memory 304 may include a cache memory (e.g., a cache memory of the processor 302), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 304 may include a non-transitory computer-readable medium. The memory 304 may store instructions 306. The instructions 306 may include instructions that, when executed by the processor 302, cause the processor 302 to perform operations described herein. Instructions 306 may also be referred to as code, which may be interpreted broadly to include any type of computer-readable statement(s) as discussed above with respect to FIG. 2.

The physical channel generation module 308 may be implemented via hardware, software, or combinations thereof. For example, the physical channel generation module 308 may be implemented as a processor, circuit, and/or instructions 306 stored in the memory 304 and executed by the processor 302. The physical channel generation module 308 may be used for various aspects of the present disclosure. The physical channel generation module 308 is further configured to generate information blocks that may be used by the UEs 115. For example, the information blocks can be used by the UEs 115 to synchronize with the network, e.g., an NR or LTE network. The physical channel processing module 308 may further encode the information blocks that may be sent by the transceiver 310 to the network. In some examples, the physical channel generation module 308 may use encoding to encode the information blocks. Information blocks may include system information blocks and master information blocks and are described with respect to FIGS. 7 and 8. In some examples, the physical channel generation module 308 may be implemented by the processor 302.

As shown, the transceiver 310 may include the modem subsystem 312 and the RF unit 314. The transceiver 310 can be configured to communicate bi-directionally with other devices, such as the UEs 115 and/or another core network element. The modem subsystem 312 may be configured to modulate and/or encode data according to a MCS, e.g., a LDPC coding scheme, a turbo coding scheme, a convolutional coding scheme, an encoding scheme, a digital beamforming scheme, etc. The RF unit 314 may be configured to process (e.g., perform analog to digital conversion or digital to analog conversion, etc.) modulated/encoded data from the modem subsystem 312 (on outbound transmissions) or of transmissions originating from another source such as a UE 115. The RF unit 314 may be further configured to perform analog beamforming in conjunction with the digital beamforming. Although shown as integrated together in transceiver 310, the modem subsystem 312 and the RF unit 314 may be separate devices that are coupled together at the BS 105 to enable the BS 105 to communicate with other devices.

The RF unit 314 may provide the modulated and/or processed data, e.g. data packets (or, more generally, data messages that may contain one or more data packets and other information), to the antenna 316 for transmission to one or more other devices. This may include, for example, transmission of information to complete attachment to a network and communication with a camped UE 115 according to embodiments of the present disclosure. The antenna 316 may further receive data messages transmitted from other devices and provide the received data messages for processing and/or demodulation at the transceiver 310. Although FIG. 3 illustrates antenna 316 as a single antenna, antenna 316 may include multiple antennas of similar or different designs in order to sustain multiple transmission links.

Figure 4:
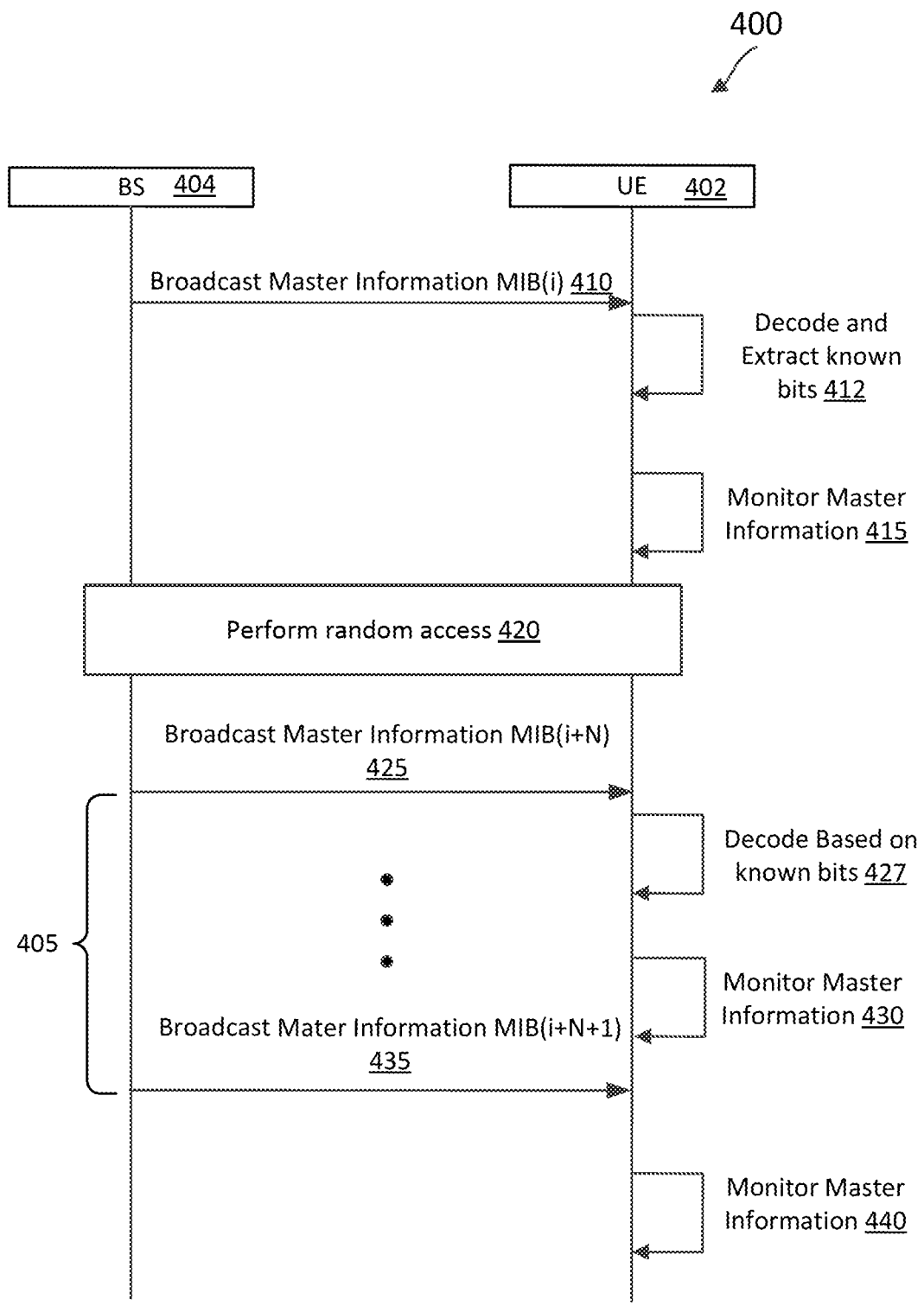
FIG. 4 illustrates a signaling diagram of a method for performing monitoring by an exemplary UE according to some embodiments of the present disclosure.

FIG. 4 illustrates a signaling diagram of a method 400 for performing monitoring by an exemplary UE according to some embodiments of the present disclosure. Steps of the method 400 can be executed by computing devices (e.g., a processor, processing circuit, and/or other suitable component) of wireless communication devices, such as UEs 115 and 200 and BSs 105 and 300. As illustrated, the method 400 includes a number of enumerated steps, but embodiments of the method 400 may include additional steps before, after, and in between the enumerated steps. In some embodiments, one or more of the enumerated steps may be omitted or performed in a different order. The method 400 illustrates one BS and one standalone UE in the network, e.g., an NR or LTE network, for purposes of simplicity of discussion, though it will be recognized that embodiments of the present disclosure may scale to many more UEs and/or BSs.

At step 410, BS 404 of a network (e.g., the network 100 of FIG. 1) broadcasts, in a time period (i), an encoded master information block (MIB)(i), associated with the network. The master information block may include, for example, system bandwidth information, a system frame number (SFN), and Physical Hybrid-ARQ Indicator Channel (PHICH) configuration data. The master information block may also include an error-detecting code such as a cyclic redundancy check (CRC). In some examples, the BS may encode the master information block. A UE 402 of the network may receive and decode the MIB(i) and may synchronize to the network based on the decoded information.

At step 412, upon receiving the MIB(i), UE 402 decodes the received encoded MIB(i). By virtue of decoding, UE 402 can extract known bits from a received MIB. In some examples, the known bits are the bits of MIB that may not change from a time period to the next. Thus, a UE may extract the known bits from MIB(i) and may assume the known bits will not change in a next time period or over several additional or next time periods. In some examples, the MIB may include two sub-blocks. Contents in one sub-block or its state may change more frequently relative to the other sub-block (though each sub-block's contents or state may change). In some examples, known bits can be part of an infrequently changing sub-block (as opposed to known bits of a sub-block that changes more frequently). In some examples, known bits can be predicted and may even be part of the frequently changing sub-block. Since certain bits of a MIB may be known, these bits need not necessarily be decoded thereby facilitating decoding a MIB according to some aspects.

After decoding, the UE 402 may synchronize to the network based on the decoded information block. The decoding and extraction can be performed by the physical channel processing module 208 or the processor 202 of the UE 200.

As used herein, the concept of known bits has a number of contexts. Generally, known bits may indicate that positions or locations of the bits are understood be known a priori. In some instances, known also means that changing patterns or states are also known a priori. In some instances, information to help identify known bits may be stored in a buffer or memory (e.g., a memory accessible by a UE on components within a UE).

At step 415, UE 402 of the network listens to the broadcasts from the BS 404. In some embodiments, BS 404 periodically broadcasts an updated master information block. For example, in a first time period (i), BS 404 broadcasts a first master information block and a period later which can be any time period, in a second time period (i+1), BS 404 broadcasts a second master information block different from the first master information block. In some examples, between the first and second time period, only the SFN and CRC parameters of the master information block may change. In some examples, each parameter of the master information block is represented by one or more bits.

At step 420, after obtaining an MIB, the UE 402 can perform random access procedures to establish a connection with the BS 404 of the network. After establishing the connection, the UE 402 and the BS 404 can enter a normal operation stage, where operational data may be exchanged. In some examples, the normal operation includes BS 404 requesting data from UE 402 and the UE 402 responding to the request.

At step 425, BS 404 broadcasts, in a time period (i+N), an encoded MIB (i+N) associated with the network and UE 402 may receive the encoded MIB (i+N).

At step 427, UE 402 of the network decodes the received MIB (i+N). The decoding may be performed based on the known bits. In some examples, the physical channel processing module 208 or the processor 202 of the UE 200 may use the a priori knowledge of the known bits to decode the received encoded MIB(i+N). In some examples, the decoder may use the known bits as part of the decoding process to facilitate the decoding process and to reduce latency and conserve energy by a faster decoding.

At step 430, UE 402 of the network listens to the broadcasts from the BS 404. In some examples, BS 404 repeats the broadcast of a same master information block. For examples, the BS may repeat the broadcasts of the MIB(i+N) three times during a time period 405.

At step 435, BS 404 broadcasts a MIB(i+N+1) associated with the network in a next time period (i+N+1), and the UE 402 receives the MIB(i+N+1).

At step 440, UE 402 of the network listens to the broadcasts from the BS 404.

Figure 5:
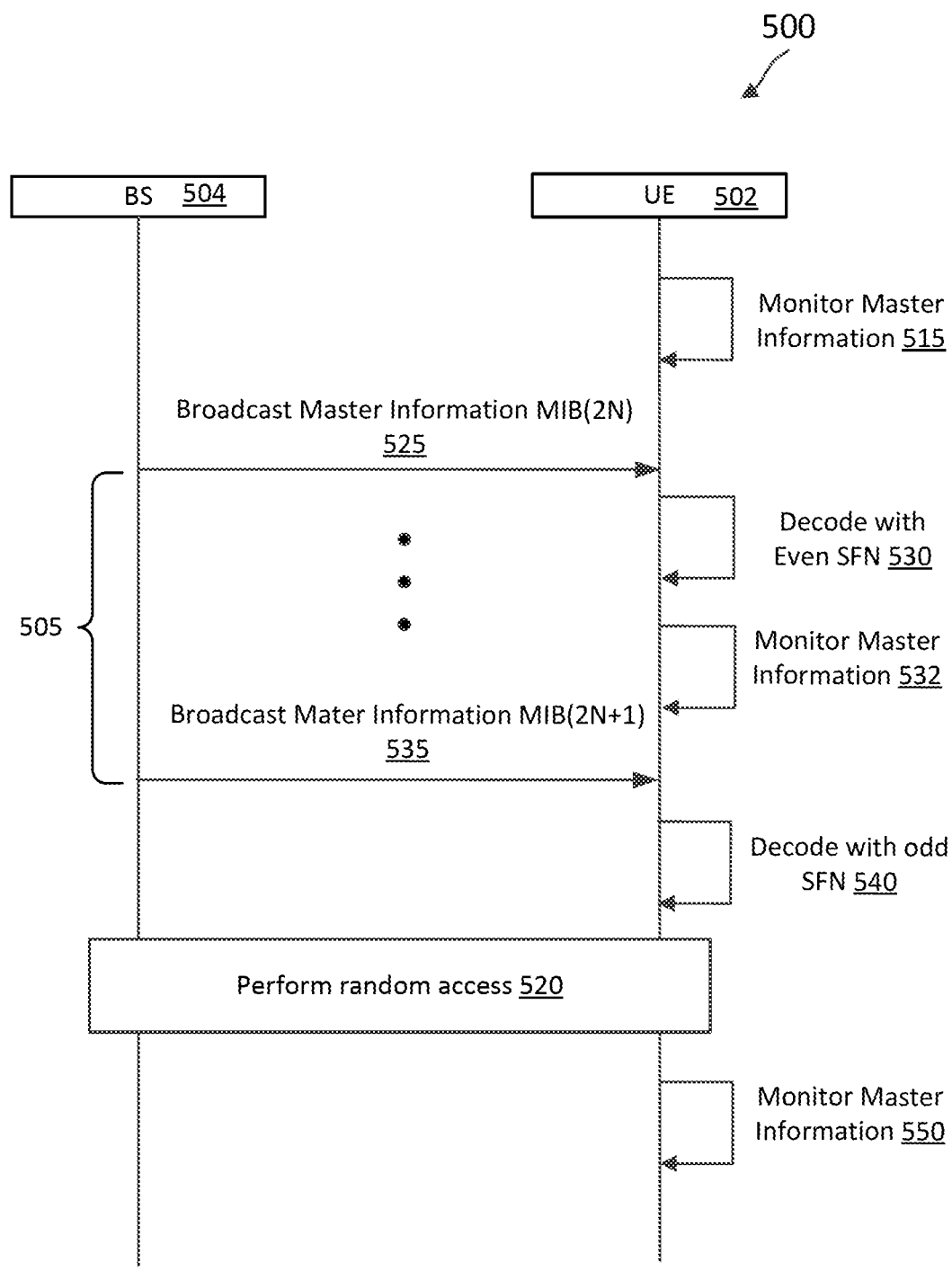
FIG. 5 illustrates a signaling diagram of a method for performing monitoring by an exemplary UE according to some embodiments of the present disclosure.

FIG. 5 illustrates a signaling diagram of a method 500 for performing monitoring by an exemplary UE according to some embodiments of the present disclosure. Steps of the method 500 can be executed by computing devices (e.g., a processor, processing circuit, and/or other suitable component) of wireless communication devices, such as UEs 115 and 200 and BSs 105 and 300. As illustrated, the method 500 includes a number of enumerated steps, but embodiments of the method 500 may include additional steps before, after, and in between the enumerated steps. In some embodiments, one or more of the enumerated steps may be omitted or performed in a different order. The method 500 illustrates one BS and one standalone UE in the network, e.g., an NR or LTE network, for purposes of simplicity of discussion, though it will be recognized that embodiments of the present disclosure may scale to many more UEs and/or BSs.

At step 515, UE 502 of a network (e.g., the network 100 of FIG. 1) listens to the broadcasts from BS 504 of the network. In some embodiments, BS 504 periodically broadcasts an updated master information block. For example, in a first time period (i), BS 504 broadcasts a first master information block and a period later which can be any time period, in a second time period (i+1), BS 504 broadcasts a second master information block different from the first master information block. In some examples, between the first and second time period, only the SFN and CRC parameters of the master information block may change. In some examples, each parameter of the master information block is represented by one or more bits.

At step 525, BS 504 broadcasts an encoded MIB (2N) associated with the network at a time period (2N). The master information block may include, for example, system bandwidth information, a system frame number (SFN), and Physical Hybrid-ARQ Indicator Channel (PHICH) configuration data. The master information block may also include an error-detecting code such as a cyclic redundancy check (CRC). In some examples, the BS may encode the master information block. UE 502 may receive the master information block and may decode the received information block. In some examples, the UE 502 may use a decoded information block to synchronize with the network. For example, the SFN may be incremented by 1 at about every 40 milliseconds (ms) interval in LTE/eMTC and at about every 640 ms for narrowband-Internet of things (NB-IOT). In some examples, the SFN of the received encoded master information block (MIB) (2N) is an even number.

At step 530, UE 502 of the network decodes the received encoded MIB (2N). In some examples, the MIB may include two sub-blocks such that a sub-block may change more frequently that the other sub-block. The decoding can be performed by the physical channel processing module 208 or the processor 202 of the UE 200. As a result, an even SFN may be decoded from the received encoded MIB (2N).

At step 532, UE 502 of the network listens to the broadcasts from the BS 504. In some embodiments, BS 504 periodically broadcasts an updated master information block. In some examples, between the first and second time period, only the SFN parameter of the master information block may change.

At step 535, in time period (2N+1), BS 504 broadcasts an encoded MIB(2N+1) associated with the network and UE 502 may receive the MIB(2N+1). As discussed, the SFN of the MIB(2N) can be an even number and thus the SFN of the MIB(2N+1) may be an odd number.

At step 540, UE 502 of the network decodes the received encoded MIB (2N+1). The decoding can be performed by the physical channel processing module 208 or the processor 202 of the UE 200. The decoding may be a joint decoding of the MIB (2N) and MIB (2N+1). The decoding may be based on the SFN of the MIB (2N+1) being an odd number such that only one bit may change from MIB (2N) to MIB (2N+1). In some examples, when the SFN includes a length of about 8 bits, only the least significant bit (LSB) changes by 1 bit, thus the change in an 8-bit SFN is represented by 00000001 with 0 representing no change and 1 representing a change. The occurrence of a single bit change at the LSB may have a probability of about ½. In some examples, a CRC may be included in the MIB, but can be recalculated based on the change in the one bit of SFN. On the other hand, for MIB (2N+1) changing to MIB (2N+2), odd to even, for the 8-bit SFN example, the SFN again increases by 1, but the binary representation of the change in the SFN can be one of the following seven patterns: 11111111, 01111111, 00111111, 00011111, 00001111, 00000111, and 00000011. The probabilities of occurrences for the bit-change patterns 11111111, 01111111, 00111111, 00011111, 00001111, 00000111, and 0000001 may be about $\frac{1}{256}$, $\frac{1}{256}$, $\frac{1}{128}$, $\frac{1}{64}$, $\frac{1}{32}$, $\frac{1}{16}$, $\frac{1}{8}$, $\frac{1}{4}$, respectively. It should be noted that, in some embodiments, the SFN in the MIBs may be incremented by one at each period and a modulo function may be applied to the incremented SFN with respect to a base of a maximum SFN in the network.

The UE may not know whether the SFN in a first received master information block is odd or even during joint decoding. Thus, the UE may be required to try a variety of combinations (e.g. eight combinations) of SFN bit pattern changes. For example, one pattern for the case where the first received period had an even SFN ad seven patterns for the cases where the first received period had an odd SFN. Such approach can increase the UE complexity substantially.

To reduce decoding complexity, at a first attempt, the UE may perform joint decoding of MIBs in the first and second received periods assuming that the MIB in the first received period was an even SFN. Such approach may fail when the MIB in the first received period is actually an odd SFN. To solve that issue, when the first attempt fails, in a next attempt, the UE may perform joint decoding of MIBS in second and third received periods assuming again that the MIB in the second received period is an even SFN. With this approach, decoding complexity at the UE may not increase significantly.

In some examples, to improve detection performance, the UE may perform the joint decoding for both cases where the SFN in the second received period corresponds to either an odd SFN or an even SFN. Thus, in some instances, when MIBs from two receiving periods differ from each other by a number of bit patterns (e.g., the 8 patterns described above), a UE may perform joint decoding across the MIBs based on an assumption that the two MIBs differ from each other by a subset of the bit patterns (e.g., a transition from an even SFN to an odd SFN) to reduce the decoding complexity. In some instances, the UE may select the subset of bit patterns in the assumption based on the capability of the UE, such as the amount of memory (e.g., the memory 204) available and/or the amount of power consumption. In some instances, the UE may select the subset based on the occurrence probabilities of the potential bit patterns. For example, the UE may select the bit pattern with the highest occurrence probability. For example, for an 8-bit SFN, if a UE can only try one bit pattern for joint decoding, the UE may pick the bit pattern 00000001 that has the highest probability (e.g., of ½) among the eight potential bit-change patterns. However, if the UE can try two bit patterns, the UE may try the bit change pattern 00000001 with the highest probability of ½ and the bit pattern 00000011 with the second highest probability of ¼. In some examples, the network may facilitate such a UE implementation by changing non SFN bits of the PBCH payload (before calculating CRC) only when SFN is even.

At step 520, after obtaining an MIB, the UE 502 can perform random access procedures to establish a connection with the BS 504 of the network. After establishing the connection, the UE 502 and the BS 504 can enter a normal operation stage, where operational data may be exchanged. In some examples, the normal operation includes BS 504 requesting data from UE 502 and the UE 502 responding to the request. In some examples, the step 520 includes UE 502 requesting data from BS 504 and BS 504 responding to the request.

At step 550, UE 502 of the network listens to the broadcasts from the BS 504.

Figure 6:
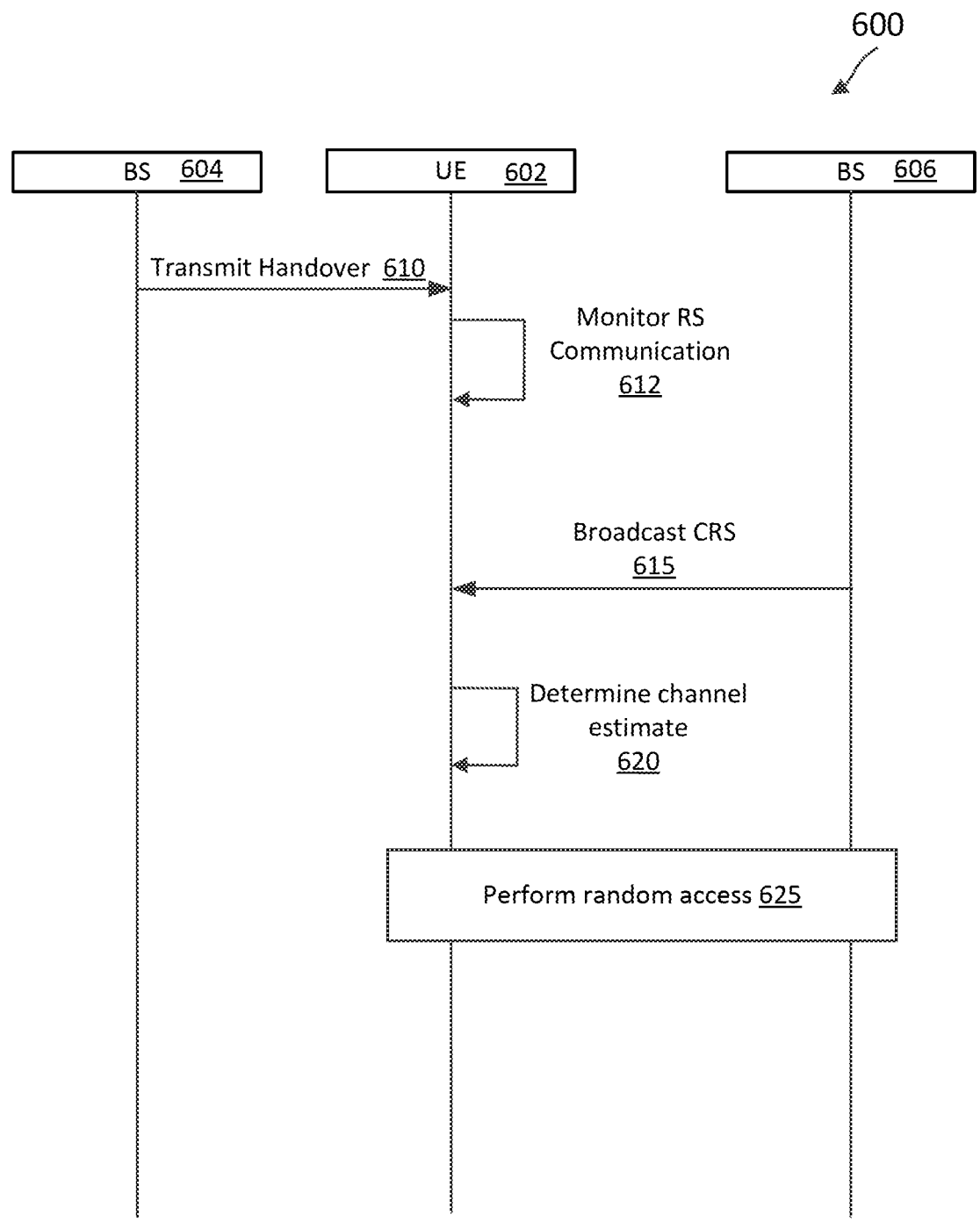
FIG. 6 illustrates a signaling diagram of a method for performing handover for a UE between two cells according to some embodiments of the present disclosure.

FIG. 6 illustrates a signaling diagram of a method 600 for performing handover between two cells by an exemplary UE according to some embodiments of the present disclosure. Steps of the method 600 can be executed by computing devices (e.g., a processor, processing circuit, and/or other suitable component) of wireless communication devices, such as UEs 115 and 200 and BSs 105 and 300. As illustrated, the method 600 includes a number of enumerated steps, but embodiments of the method 600 may include additional steps before, after, and in between the enumerated steps. In some embodiments, one or more of the enumerated steps may be omitted or performed in a different order. The method 600 illustrates two BSs and one standalone UE in the network, e.g., an NR or LTE network, for purposes of simplicity of discussion, though it will be recognized that embodiments of the present disclosure may scale to many more UEs and/or BSs.

At step 610, BS 604 of a network (e.g., the network 100 of FIG. 1) transmits a handover message to UE 602 of the network. The BS 604 may be of a first cell in the network. The BS 604 may be a serving BS of the UE 602. The first cell may be referred to as a serving cell. The handover message may be processed by the physical channel processing module 208 or the processor 202 of the UE 200.

In some embodiments, the handover message may be included in a non-multicast broadcast single frequency network (non-MBSFN) subframe. The handover message may correspond to a handover between the first cell and a second cell. The second cell may be referred to as a target cell. The handover message may include configuration information for the second cell. In some examples, based on the received configuration information of the second cell, UE 602 may be informed of a timing of reference signals, e.g., cell-specific reference signals (CRS), from a second base station 606 of the second cell.

At step 612, UE 602 of the network listens for the reference signals from the BS 606. In some examples, the transceiver 210 of the UE 200 listens to receive a CRS that may be included in the subframes.

At step 615, UE 602 of the network receives a reference signal from the BS 606. In some examples, the transceiver 210 of the UE 200 receives a CRS. In some examples, UE 602 may receive one or more CRS included in one or more subframes based on the configuration information.

At step 620, UE 602 of the network performs channel estimation based on the received reference signal. In some examples, the physical channel processing module 208 or the processor 202 of the UE 200 performs the channel estimation based on the received one or more CRS.

In some embodiments, the non-MBSFN configuration information indicates a correlation between the configuration of the first cell and the configuration of the second cell during the handover. In some embodiments, the correlation indicates that one or more bits of an information block of the first cell and an information block of the second cell are the same. In some examples, the correlation indicates that the known bits of the information block of the first cell (serving cell) and the second cell (target cell) are the same and as described above a decoder may use the known bits to facilitate the decoding process and to reduce latency and conserve energy by faster decoding.

At step 625, after obtaining an MIB, the UE 602 can perform random access procedures to establish a connection with the BS 606 of the network. After establishing the connection, the UE 602 and the BS 606 can enter a normal operation stage, where operational data may be exchanged. In some examples, the normal operation includes BS 606 requesting data from UE 602 and the UE 602 responding to the request. In some examples, the step 625 includes UE 602 requesting data from BS 606 and BS 606 responding to the request.

Figure 7:
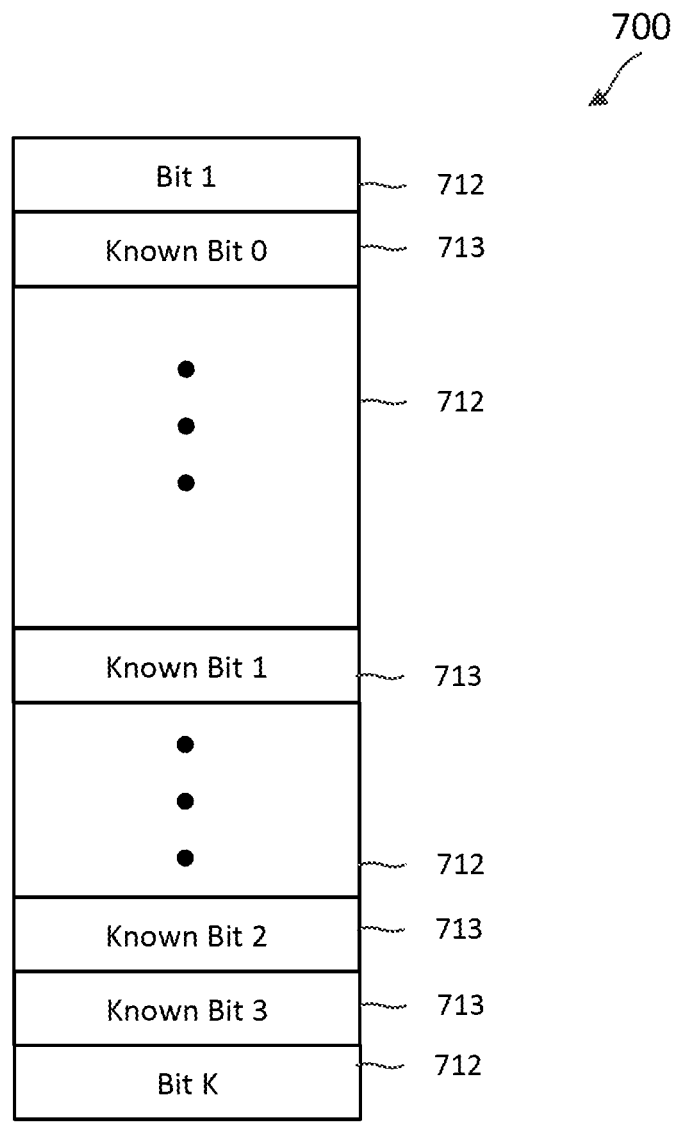
FIG. 7 is a block diagram of a bit structure of an exemplary master information block according to some embodiments of the present disclosure.

FIG. 7 is a block diagram of a bit structure of an exemplary master information block 700 according to some embodiments of the present disclosure. The master information block 700 may be broadcasted by a BS (e.g., the BSs 105, 300, 404, 504, and 604) in a network (e.g., the network 100). In some examples, the master information block includes a total of K bits, where K is a positive integer. Some bits in a master information block may change more frequently than other bits in the master information block. For example, the bits representing information, such as SFN, CRC, beam index, a reserved field 0, and/or other parameters, may change more frequently than the bits representing information, such as the cell basic physical layer parameters, SIB-1 scheduling information, a reserve field 1, and/or other parameters. The bits that change more frequently may change from one time period to a next time period, while the bits that may change less frequently remain the same for several time periods. Some of the bits, e.g., bits 712, of the master information block may not be known to a decoder of the encoded master information block. Conversely, some of the bits, e.g., bits 713, may be known to the decoder or at least predictable by the decoder. In some examples, the decoder may use the known bits or the predictable bits as part of the decoding process to facilitate the decoding process to reduce latency and conserve energy by making a faster decoding. Additionally, use of the known bits, may provide more reliable decoded parameters.

In some examples, the known bits are extracted from a previously received or preceding master information block and the known bits may be used for the decoding of a currently received encoded master information blocks. In some instances, the known bits extracted from the previously received master information block may be stored or buffered in memory accessible by the decoder (e.g., the decoder and the memory may be located at a UE). Upon receiving the master information block 700, the decoder may determine that known bits are stored or buffered in memory any may retrieve the stored or buffered known bits for the decoding.

In some examples, the decoder may know how the known bits are changing and may predict bits in the currently received master information block based the known bits of the preceding master information block. In some examples, to decode the information block of a neighbor cell, the UE may obtain the known bits of a neighboring cell PBCH from a handover message received from the serving cell during a handover process or may assume that some information bits of the neighboring cell PBCH are same as the serving cell PBCH. For example the UE may assume the bandwidth of the neighboring cell is the same as the bandwidth of the serving cell. To facilitate improved decoder performance of the UE for the PBCH/SIB by using known bits, the network may broadcast information in the handover message about the PBCH/SIB bits that may otherwise not be needed by the UE for the handover.

Figure 8:
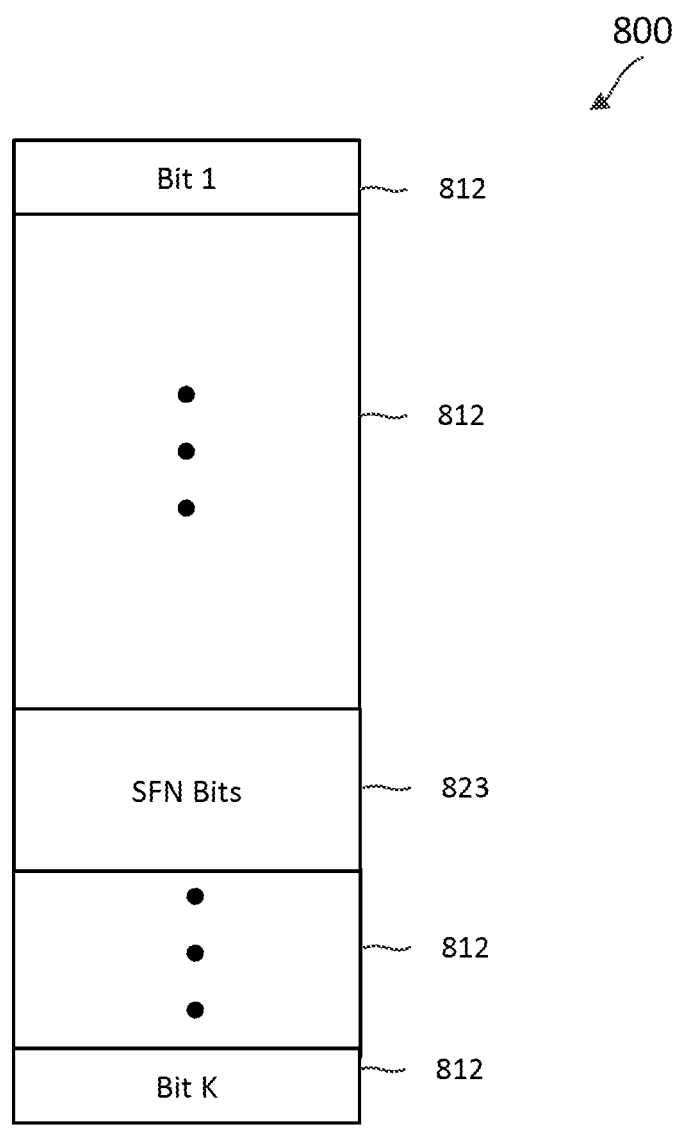
FIG. 8 is a block diagram of a bit structure of an exemplary master information block according to some embodiments of the present disclosure.

FIG. 8 is a block diagram of a bit structure of an exemplary master information block 800 according to some embodiments of the present disclosure. As noted the master information block 800 may include other bits 812 as well as the system frame number (SFN) bits 823. In some examples, SFN is part of the frequently changing information of the master information block. However, the change in SFNs may be forecasted by the decoder. For examples, if an SFN of a master information block is an even number, the SFN of the next master information block immediately following may be an odd number.

Figure 9:
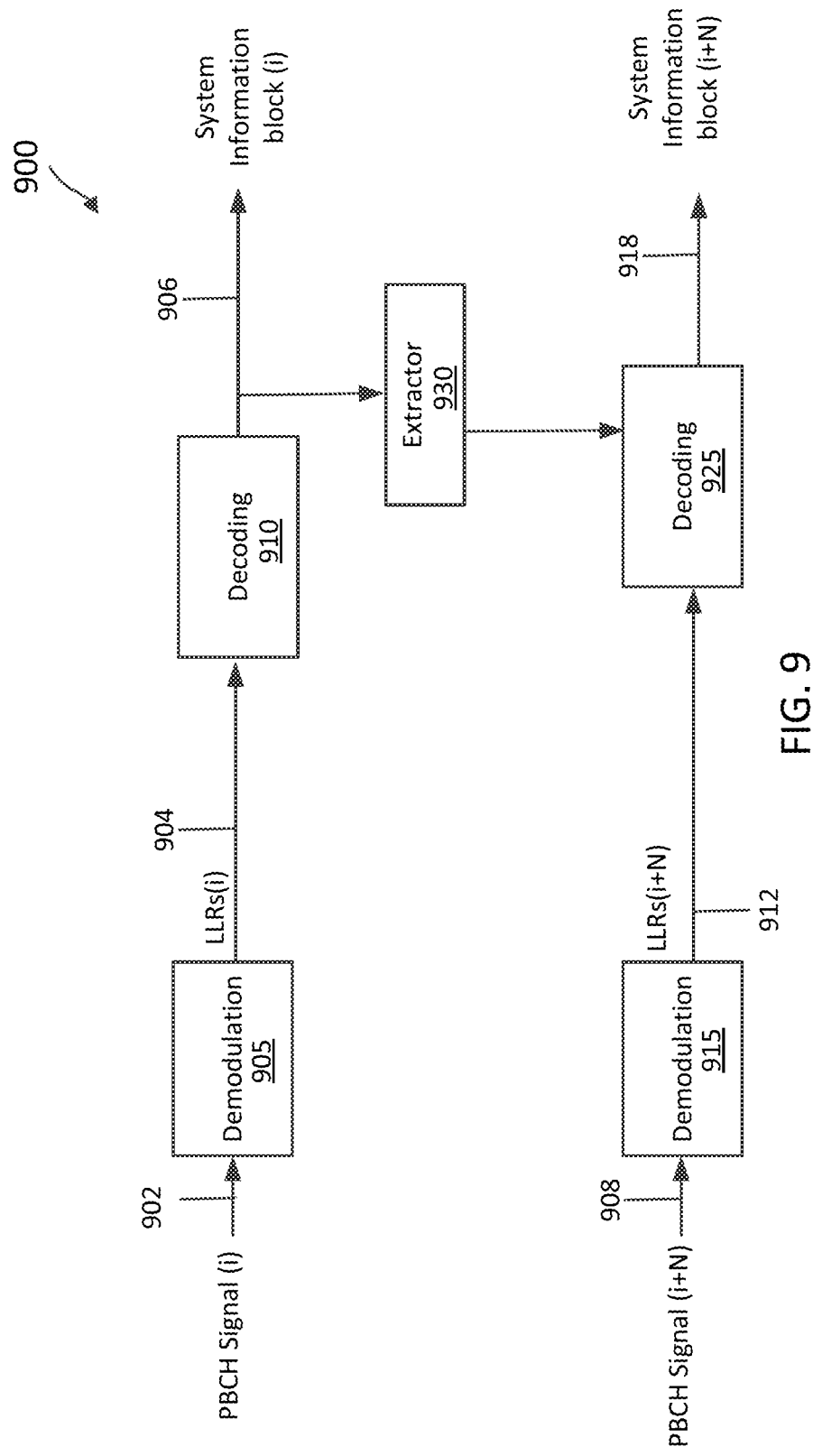
FIG. 9 is a block diagram of an exemplary system for decoding a master information block according to some embodiments of the present disclosure.

FIG. 9 is a block diagram of an exemplary system 900 for decoding a master information block according to some embodiments of the present disclosure. The system 900 may be included in a UE, such as UEs 115 and 200. The system 900 includes demodulation units 905 and 915, decoding units 910 and 925, and an extractor unit 930. In some examples, the demodulation units 905 and 915, the decoding units 910 and 925, and the extractor unit 930 of the system 900 are implemented by the processor 202 and/or physical channel processing module 208 of the UE 200.

The demodulation unit 905 is configured to receive a PBCH signal 902 in a time period (i). The received PBCH signal 902 may include an encoded MIB (e.g., the MIBs 700 and 800). The demodulation unit 905 is configured to demodulate the received PBCH signal 902 to produce a plurality of log likelihood ratios (LLRs) 904, for example, corresponding to a codeword associated with the encoded MIB.

The decoding unit 910 is configured to receive the LLRs 904 to reproduce a master information block 906 corresponding to time period (i). In some embodiments, the PBCH signal 902 is transmitted by a BS, such as BSs 105 and 300, through a communication channel, e.g., a PBCH, and is received by a receiver such as the transceiver 210 of the UE. Thus, noise may be associated with the transmission and reception of the PBCH signal 902 and the master information block 906 may be an estimate of the master information block. The generated, e.g., estimated, master information block 906 may be used by the UE to synchronize the UE at time period (i) with a network such as network 100 of FIG. 1. The decoding unit 910 may implement a decoding based on the encoder of the base station or an encoding algorithm used by the base station. In some examples, any type of encoding and the corresponding decoding may be used.

At time period (i), the extractor unit 930 is configured to extract the known bits from the estimated master information block 906 and may provide the known bits to the decoding unit 925. In some examples, the known bits may correspond to one or more fields of the master information block that do not change from a time period to the next. In some examples, the known bits may correspond to one or more fields of the master information block that may be predicted from a time period to the next.

The demodulation unit 915 may be substantially similar to the demodulation unit 905. In some examples, the demodulation units 905 and 915 may correspond to the same demodulation unit. At time period (i+N), where N is an integer equal to or greater than one, the demodulation unit 915 may receive another PBCH signal 908. The received PBCH signal 908 may include an encoded MIB, associated with time period (i+N). The demodulation unit 915 may demodulate the received PBCH signal 908 and may LLRs 912 corresponding to a codeword associated with the encoded MIB in time period (i+N).

At time period (i+N), the decoding unit 925 may receive the known bits from the extractor unit 930. The decoding unit 925 may receive the LLRs 912 and may use the received known bits to reproduce a master information block 918 corresponding to time period (i+N). In some embodiments, the PBCH signal 908 is transmitted by a BS, such as BSs 105 and 300, through a communication channel, e.g., a PBCH, and is received by a receiver such as the transceiver 210 of the UE. Thus, as described, the master information block 918 may be decoded based at least on the known bits. The use of the known bits in part of the decoding process may facilitate the decoding process to reduce latency and conserve energy.

A UE passing the synchronization phase may be required to continuously and repeatedly decode PBCH signal in the idle state and this may cause, the decoding latency, loss of efficiency, and power consumption, especially in URLLC and/or mMTC cases. As discussed, in a UE, generating the master information block 918 at time period (i+N) from the encoded master information block 912 may be accomplished by using the known bits of the master information block 906 and thus saving power and improving latency of the UE.

As discussed the transmission and reception of the PBCH signals involve noise and thus the decoded master information block 918 may be an estimated master information block at time (i+N).

In some embodiments, receiving the PBCH signal 902 (e.g., carrying a first encoded information block) may include receiving the first encoded information block from a physical broadcast channel during a first time period (i). Receiving the PBCH signal 908 (e.g., carrying a second encoded information block) may include receiving the second encoded information block from the physical broadcast channel during a second time period (i+N) after the first time period.

Figure 10:
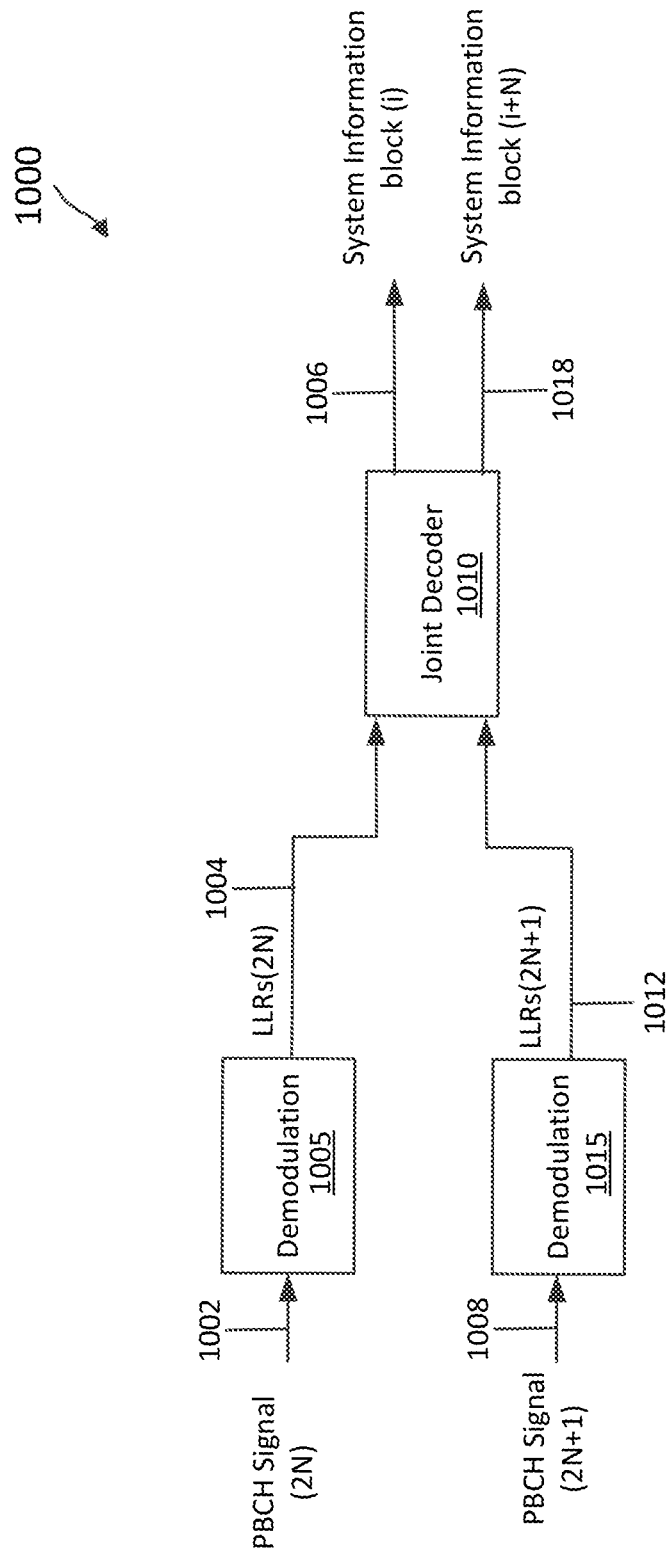
FIG. 10 is a block diagram of an exemplary system for jointly decoding master information blocks according to some embodiments of the present disclosure.

FIG. 10 is a block diagram of an exemplary system 1000 for decoding a master information block according to some embodiments of the present disclosure. The system 1000 includes demodulation units 1005 and 1015, and a joint decoder 1010. In some examples, the demodulation units 1005/1015 and the joint decoder 1010 may be implemented by the processor 202 and/or physical channel processing module 208 of the UE 200.

Similar to system 900, the demodulation unit 1005 is configured to receive a PBCH signal 1002 in a time period (i). The PBCH signal 1002 may include an encoded MIB (e.g., the MIBs 700 and 800). The demodulation unit 1005 is configured to demodulate the received PBCH signal 1002 to produce a plurality of LLRs 1004, for example, corresponding to a codeword associated with the encoded MIB.

The demodulation unit 1015 may be substantially similar to the demodulation unit 1005. In some examples, the demodulation units 1005 and 1015 may correspond to the same demodulation unit. At time period (i+N), where N is an integer equal to or greater than one, the demodulation unit 1015 may receive another PBCH signal 1008. The received PBCH signal 1008 may include an encoded MIB, associated with time period (i+N). The demodulation unit 1015 may demodulate the received PBCH signal 1008 to produce LLRs 1012 corresponding to a codeword associated with the encoded MIB in time period (i+N).

In some embodiments, the joint decoder 1010 is configured to receive the LLRs 1004 and 1012 and perform joint decoding on the LLRs 1004 and 1012 to reproduce a master information block 1006 corresponding to a time period (i) and a master information block 1018 corresponding to a time period (i+N). The UE may synchronize to a network such as the network 100 of FIG. 1 based on the decoded master information block 1006 and 1018.

For example, the joint decoder 1010 can perform the following: when the joint decoder 1010 receives a block of LLRs 1004 corresponding to an even SFN, the joint decoder 1010 implements an individual decoding of the LLRs 1004. However, when the joint decoder 1010 receives a block of LLRs 1012 corresponding to an odd SFN, the joint decoder 1010 implements a joint decoding and uses the information of the preceding master information block. In some examples, the SFN may be the only parameter that changes between consecutive master information blocks and thus from a master information block corresponding to an even SFN to a master information block corresponding to an odd SFN immediately following the even SFN, only one bit of the master information block may change. In some examples, the CRC followed by a channel code such as a tail biting convolutional code (TBCC) is used to obtain the encoded MIB. The CRC and TBCC are both linear codes. The CRC and the channel code together also form a linear block code. For linear block codes, changes in the encoded bits for two different payloads can be obtained by encoding the difference in the payloads using the same linear block code. Thus the encoded master information block for the next transmission may be calculated based on the changes to the master information block, and the next master information block can be estimated. In some examples, the master information block corresponding to the odd SFN can be predicted, e.g., estimated, from the master information block of the even SFN and this information can be used to facilitate the decoding of the encoded master information block of the odd SFN and may reduce latency and save power in the UE.

UEs may not always be aware of whether the received MIB block includes an even SFN or an odd SFN. To reduce the complexity of the decoder, the UE may assume that the first received block includes an even SFN and second received block includes an odd SFN, and thus only one bit changes in the payload. If the actual SFN for the first received block is even and second received block is odd, the joint decoding may pass as expected. Yet, if the SFN in the first received block is odd instead of even as assumed, the joint decoding may fail. In addition, as described above, if the UE has a sufficient amount of processing power, the UE may attempt to decode with multiple SFN change hypotheses (e.g., more payload change bit patterns) instead of a single bit change pattern for the even-to-odd SFN change.

Figure 11:
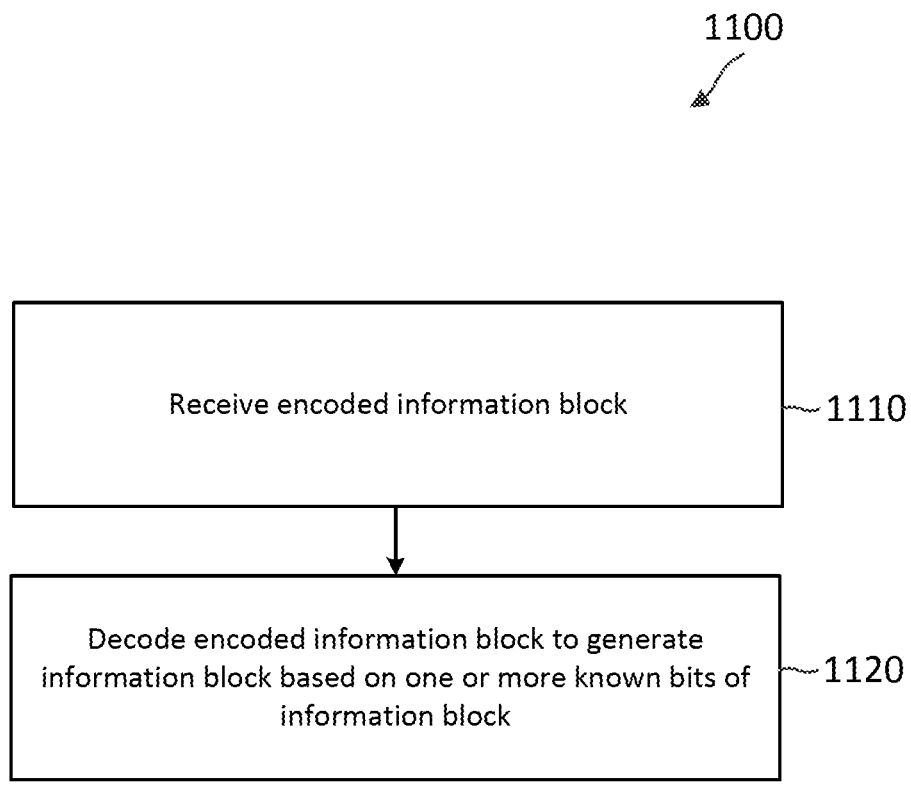
FIG. 11 is a flow diagram of a method of receiving a master information block by an exemplary UE according to some embodiments of the present disclosure.

FIG. 11 is a flow diagram of a method 1100 of receiving an information block, e.g., a master information block, by an exemplary UE according to some embodiments of the present disclosure. Steps of the method 1100 can be executed by a computing device (e.g., a processor, processing circuit, and/or other suitable component) of a wireless communication device, such as the UEs 115 and 200. As illustrated, the method 1100 includes a number of enumerated steps, but embodiments of the method 1100 may include additional steps before, after, and in between the enumerated steps. In some embodiments, one or more of the enumerated steps may be omitted or performed in a different order.

At step 1110, the method 1100 includes receiving, by a wireless communication device, an encoded information block. The wireless communication device may be a standalone UE, e.g., NR UE. In some examples, the receiving is performed by, for example, by the transceiver 210 of the UE 200.

At step 1120, the method 1100 includes decoding, by the wireless communication device, the encoded information block to generate an information block based on one or more known bits of the information block. In some examples, the decoding is performed by, for example, by the transceiver 210 of the UE 200. In some examples, decoding based on the known bit of the information block facilitates the decoding process and improves latency and conserves energy.

In some examples, the method 1100 includes receiving, by the wireless communication device UE 200, a second encoded information block. The method 1100 further includes decoding, by the wireless communication device UE 200, the second encoded information block to generate a second information block and extracting one or more known bits 713 as described with respect to FIG. 7, from the second information block. The bit extraction can be performed by, for example, the extractor unit 930 of FIG. 9. In some examples, the second encoded information block is received prior to the first encoded information block.

In some embodiments, receiving the first encoded information block 1004 includes receiving a first signal carrying the first encoded information block and receiving the second encoded information block 1008 includes receiving a second signal carrying the second encoded information block.

Referring back to FIG. 9, in some embodiments, determining the first estimate of the first information block may include demodulating the first signal by the demodulation unit 905 to produce a first plurality of log-likelihood ratios (LLRs) 904 consistent with the first encoded master information block and then decoding the first plurality of LLRs by the decoding unit 910 to generate the first estimate. In some examples, an information block is system information or a master information block by processor 202 or by the physical channel processing module 208 of UE 200.

In some embodiments, determining the second estimate of second information block may include demodulating the second signal by the demodulation unit 915 to produce a second plurality of LLRs 912 consistent with the second encoded master information block and then decoding the second plurality of LLRs by the decoding unit 925 to generate the second estimate 918 by processor 202 or by the physical channel processing module 208 of UE 200.

In some embodiments, the decoding by the decoding module 925 may include using the known bits to facilitate the decoding.

In some embodiments, method 1100 may be performed by, for example, UE 200, to receive a third encoded information block and decode the third encoded information block based at least on the one or more known bit.

Figure 12:
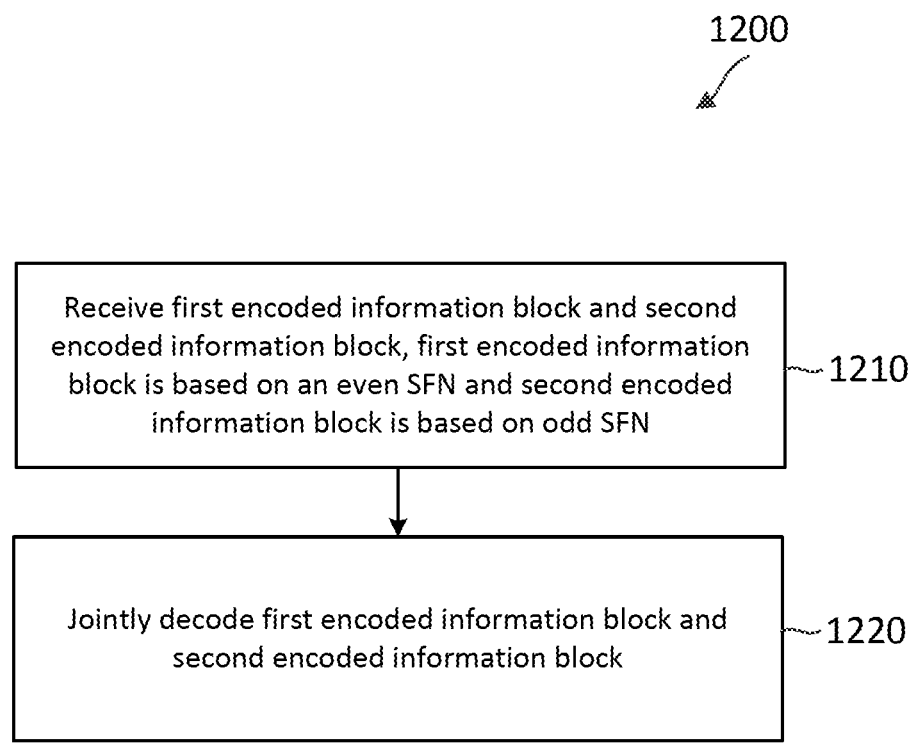
FIG. 12 is a flow diagram of a method of receiving master information blocks by an exemplary UE according to some embodiments of the present disclosure.

FIG. 12 is a flow diagram of a method 1200 of receiving a master information blocks by an exemplary UE according to some embodiments of the present disclosure. Steps of the method 1200 can be executed by a computing device (e.g., a processor, processing circuit, and/or other suitable component) of a wireless communication device, such as the UEs 115 and 200. As illustrated, the method 1200 includes a number of enumerated steps, but embodiments of the method 1200 may include additional steps before, after, and in between the enumerated steps. In some embodiments, one or more of the enumerated steps may be omitted or performed in a different order.

At step 1210, the method 1200 includes receiving, by a wireless communication device, a first encoded information block and a second encoded information block. The first encoded information block is based on an even SFN and the second encoded information block is based on an odd SFN. The wireless communication device may be a standalone UE. In some examples, the receiving is performed by, for example, by the transceiver 210 of the UE 200.

At step 1220, the method 1200 includes jointly decoding, by the wireless communication device, the first encoded information block and the second encoded information block. The joint decoding may be based on the first encoded information block corresponds to an even SFN and the second encoded information block corresponds to an even SFN and thus SFN may be the only variable between the first and the second information blocks and also that only one bit may have changed between even SFN and the odd SFN that may be immediately following the odd SFN. Thus, in some instances, the first and the second encoded information blocks may differ from each other by one of a plurality of potential bit patterns. As such, the joint decoding can be performed based on an assumption that the first and second encoded information blocks differ from each other by a subset of the plurality of bit patterns.

The first and second encoded information blocks may be received from a network, e.g., an NR or LTE network. In some examples, the receiving is performed by, for example, by the transceiver 210 of the UE 200.

In some embodiments and referring back to FIG. 10, receiving the first encoded information block 1004 includes receiving a first signal carrying the first encoded information block.

In some embodiments, receiving the first encoded information block includes receiving the first encoded information block from a physical broadcast channel during a first time period, 2N, and receiving the second encoded information block includes receiving the second encoded information block from the physical broadcast channel during a second time period, 2N+1, after the first time period. The first encoded information block may be generated by encoding a first information block and the second encoded information block may be generated by encoding a second information block.

In some embodiments, method 1200 includes receiving a third encoded information block based on an even SFN and a fourth encoded information block based on an odd SFN and jointly decoding the third encoded information block and the fourth encoded information block.

Figure 13:
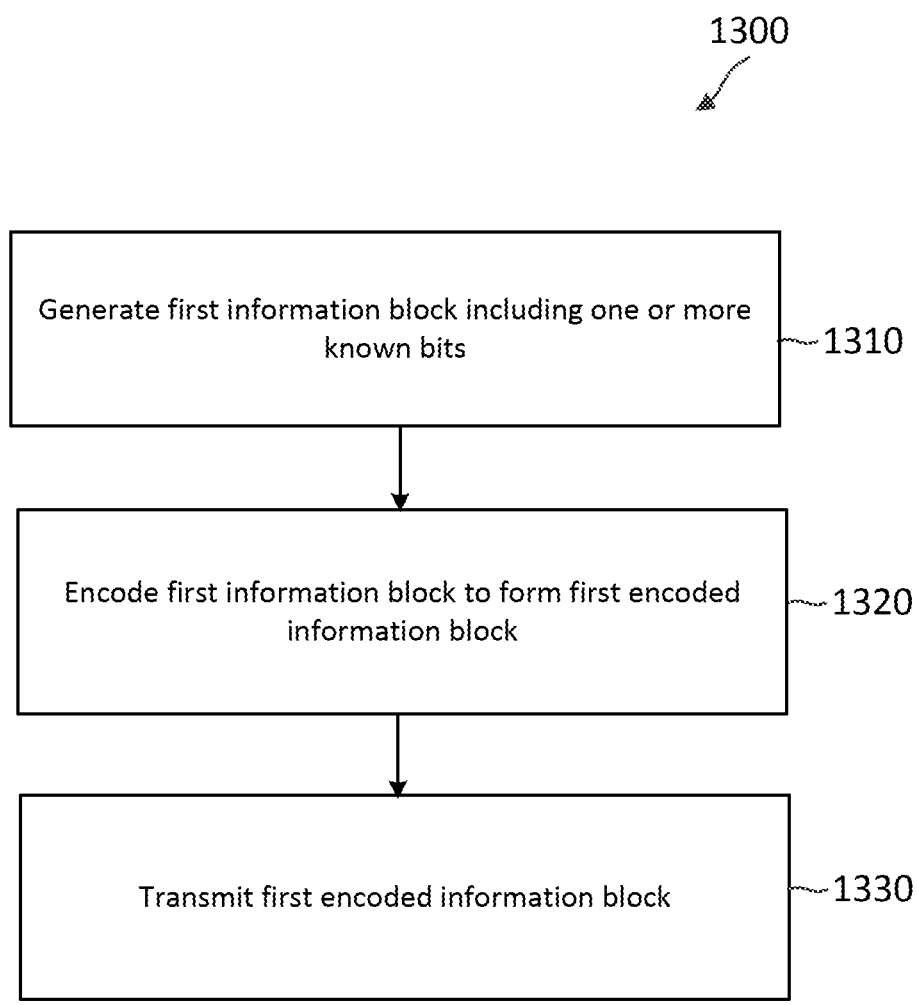
FIG. 13 is a flow diagram of a method of generating a master information block by an exemplary BS according to some embodiments of the present disclosure.

FIG. 13 is a flow diagram of a method 1300 of transmitting a master information block by an exemplary BS according to some embodiments of the present disclosure. Steps of the method 1300 can be executed by a computing device (e.g., a processor, processing circuit, and/or other suitable component) of a wireless communication device, such as the BSs 105 and 300. As illustrated, the method 1300 includes a number of enumerated steps, but embodiments of the method 1300 may include additional steps before, after, and in between the enumerated steps. In some embodiments, one or more of the enumerated steps may be omitted or performed in a different order.

At step 1310, the method 1300 includes generating, by a first wireless communication device, a first information block including one or more known bits. The first wireless communication device may be an BS of a network, e.g., an NR or LTE network. In some examples, the information block is generated, for example, by the physical channel generation module 308 and/or processor 302 of the BS 300. In some examples, the known bits are the bits of the master information block that may not change from a time period to the next and thus by extracting the known bits from a prior decoded master information block, a prospective decoder, e.g., physical channel processing module 308 or processor 302 of BS 300, may know the known bits when decoding a next master information block. In some other examples, the know bits although may change from one time period to the next but can be predicted. Thus, by extracting the known bits from a prior decoded master information block, the prospective decoder, may predict the known bits of the next master information block.

At step 1320, the method 1300 includes encoding, by the first wireless communication device, the first information block to form a first encoded information block. As noted, the first wireless communication device may be BS of a network, e.g., an NR or LTE network. In some examples, the encoding is performed by, for example, by the physical channel generation module 308 and/or processor 302 of the BS 300.

At step 1330, the method 1300 includes transmitting, by the first wireless communication device, the first encoded information block to a second communication device. The second wireless communication device which can be UE 200 may be configured to decode the first encoded information block based on the one or more known bits.

In some examples, prior to transmitting the first encoded information block the method 1300 performs transmitting a second encoded information block such that the second wireless communication device, e.g., UE 200, is configured to extract the one or more know bits from the second encoded information block.

In some embodiments and referring back to FIG. 10, transmitting the first encoded information block 1004 includes transmitting the first encoded information block 1004 via a physical broadcast channel during a first time period (i). Transmitting the second encoded information block 1008 includes transmitting the second encoded information block 1008 through the physical broadcast channel during a second time period (i+N) after the first time period, where N is one or more.

In some embodiments, transmitting the first encoded information block 1004 includes transmitting a first signal carrying the first encoded information block and transmitting the second encoded information block 1008 includes transmitting a second signal carrying the second encoded information block.

In some embodiments, transmitting the first encoded information block in method 1300 includes transmitting the first encoded information block through a physical broadcast channel during a first time period. Transmitting the second encoded information block in method 1300 includes transmitting the second encoded information block through the physical broadcast channel during a second time period prior to the first time period.

In some embodiments, method 1300 further includes transmitting a third encoded information block including the one or more known bits.

Figure 14:
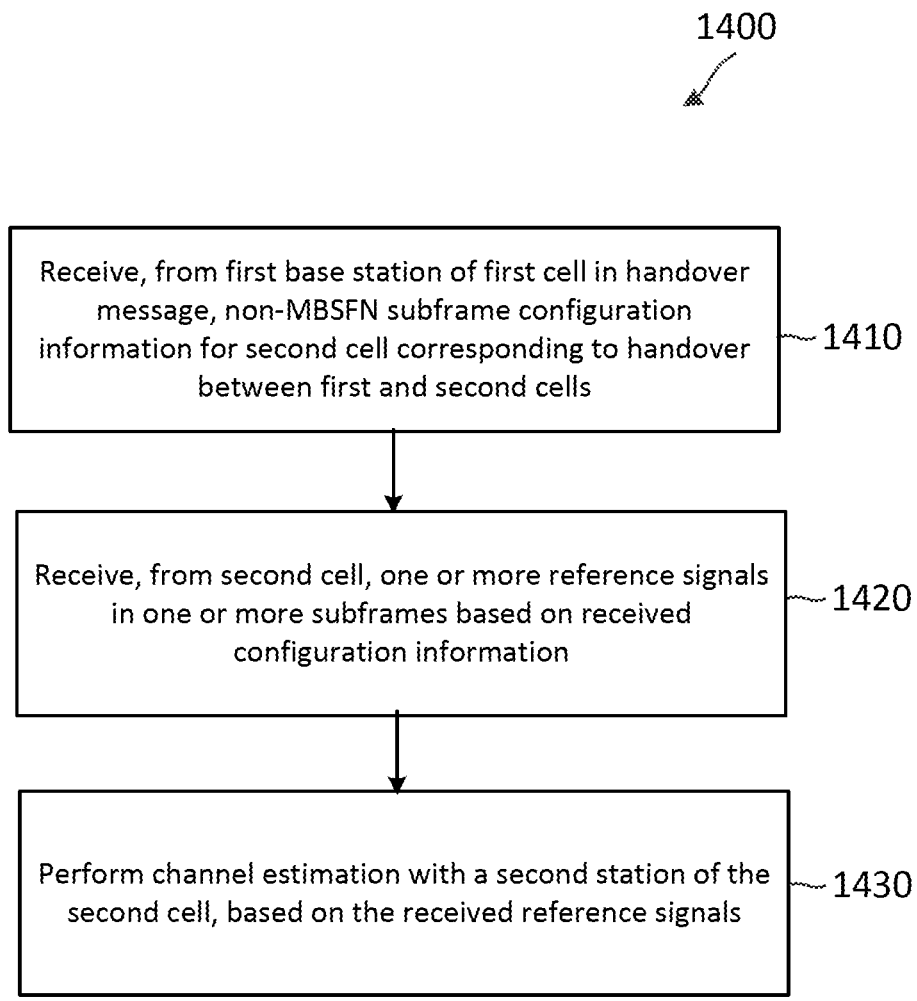
FIG. 14 is a flow diagram of a method of performing channel estimation during handover by an exemplary UE according to embodiments of the present disclosure.

FIG. 14 is a flow diagram of a method 1400 of performing channel estimation during handover by an exemplary UE according to some embodiments of the present disclosure. Steps of the method 1400 can be executed by a computing device (e.g., a processor, processing circuit, and/or other suitable component) of a wireless communication device, such as the UEs 115 and 200. As illustrated, the method 1400 includes a number of enumerated steps, but embodiments of the method 1400 may include additional steps before, after, and in between the enumerated steps. In some embodiments, one or more of the enumerated steps may be omitted or performed in a different order.

At step 1410, the method 1400 includes receiving, by a UE from a first base station of a first cell in a handover message, a non-multicast broadcast single frequency network (non-MBSFN) subframe configuration information for a second cell corresponding to a handover between the first and the second cells. The first base station may be an BS of a network, e.g., an NR or LTE network and a the UE can be UE 200.

At step 1420, the method 1400 includes receiving, from the second cell, one or more reference signals in one or more subframes based on the received configuration information. In some examples the reference signals are cell-specific reference signals (CRS) and the CRS may be received from a BS e.g., BS 300 of the second cell.

At step 1430, the method 1400 includes performing channel estimation based on the reference signals with a second station of the second cell by the UE. The UE can be UE 200. In some examples the signal to noise ratio (SNR) is low and one or more CRS are received in one or more subframes and channel estimation is performed by the one or more CRS.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

Further embodiments of the present disclosure include a method of wireless communication, comprising receiving, by a wireless communication device, one or more known bits; receiving, by the wireless communication device, a first encoded information block; and decoding, by the wireless communication device, the first encoded information block to generate a first information block based on the one or more known bits.

In some embodiments, wherein the receiving the one or more known bits includes: receiving, by the wireless communication device, a second encoded information block; decoding, by the wireless communication device, the second encoded information block to generate a second information block; and extracting, by the wireless communication device, the one or more known bits from the second information block. In some embodiments, wherein the receiving the first encoded information block includes receiving the first encoded information block from a physical broadcast channel during a first time period, and wherein the receiving the second encoded information block includes receiving the second encoded information block from the physical broadcast channel during a second time period prior to the first time period. In some embodiments, wherein the receiving the one or more known bits includes: receiving, by the wireless communication device from a first base station of a first cell, the one or more known bits, wherein the one or more known bits are associated with a second cell. In some embodiments, the method further comprises receiving, by the wireless communication device from a second base station of the second cell, a second encoded information block; and decoding, by the wireless communication device, the second encoded information block based on the one or more known bits associated with the second cell. In some embodiments, wherein the receiving the one or more known bits includes: receiving, by the wireless communication device, a handover message, wherein the handover message corresponds to a handover between the first cell and the second cell. In some embodiments, wherein the receiving the one or more known bits includes receiving one or more bits regarding at least one of a system frame number (SFN) or a hyper SFN. In some embodiments, wherein the second encoded information block is associated with at least one of a physical broadcast channel (PBCH), a system information block (SIB), a physical downlink control channel (PDCCH), a physical downlink shared channel (PDSCH), a physical uplink control channel (PUCCH), or a physical uplink shared channel (PUSCH). In some embodiments, wherein the receiving the first encoded information block includes receiving a first signal carrying the first encoded information block, wherein the receiving the second encoded information block includes receiving a second signal carrying the second encoded information block, wherein the method further comprises: determining, by the wireless communication device from the first signal, a first estimate for the first information block; and determining, by the wireless communication device from the second signal, a second estimate for the second information block. In some embodiments, wherein the determining the first estimate includes: demodulating the first signal to produce a first plurality of log-likelihood ratios (LLRs); and decoding the first plurality of LLRs to generate the first estimate; and wherein the determining the second estimate includes: demodulating the second signal to produce a second plurality of LLRs; and decoding the second plurality of LLRs to generate the second estimate.

Further embodiments of the present disclosure include a method of wireless communication, comprising receiving, by a wireless communication device, a first encoded information block and a second encoded information block, wherein the first encoded information block is based on an even system frame number (SFN) and the second encoded information block is based on an odd SFN; and jointly decoding, by the wireless communication device, the first encoded information block and the second encoded information block.

In some embodiments, wherein the odd SFN immediately follows the even SFN. In some embodiments, wherein the receiving the first encoded information block includes receiving the first encoded information block from a physical broadcast channel during a first time period, and wherein the receiving the second encoded information block includes receiving the second encoded information block from the physical broadcast channel during a second time period after the first time period, and wherein the first encoded information block is generated by encoding a first information block and the second encoded information block is generated by encoding a second information block. In some embodiments, wherein the receiving the first encoded information block includes receiving a first signal carrying the first encoded information block, wherein the receiving the second encoded information block includes receiving a second signal carrying the second encoded information block, wherein the method further comprises determining, by the wireless communication device from the first signal, a first estimate for the first information block; and determining, by the wireless communication device from the second signal, a second estimate for the second information block. In some embodiments, wherein the determining the first estimate and the second estimate includes demodulating the first signal to produce a first plurality of log-likelihood ratios (LLRs); demodulating the second signal to produce a second plurality of LLRs; and jointly decoding the first plurality of LLRs and the second plurality of LLRs to generate the first estimate and the second estimate. In some embodiments, the method further comprise receiving, by the wireless communication device, a third encoded information block based on an even SFN and a fourth encoded information block based on an odd SFN; and jointly decoding, by the wireless communication device, the third encoded information block and the fourth encoded information block.

Further embodiments of the present disclosure include a method of wireless communication, comprising generating, by a first wireless communication device, a first information block including one or more known bits; encoding, by the first wireless communication device, the first information block to form a first encoded information block; and transmitting, by the first wireless communication device to a second wireless communication device, the first encoded information block such that the second wireless communication device is configured to decode the first encoded information block based on the one or more known bits.

In some embodiments, wherein prior to transmitting the first encoded information block the method performs: transmitting, by the wireless communication device, a second encoded information block to the second wireless communication device such that the second wireless communication device is configured to extract the one or more know bits from the second encoded information block. In some embodiments, wherein the transmitting the first encoded information block includes transmitting the first encoded information block through a physical broadcast channel during a first time period, and wherein the transmitting the second encoded information block includes transmitting the second encoded information block through the physical broadcast channel during a second time period prior to the first time period. In some embodiments, wherein the transmitting the first encoded information block includes transmitting a first signal carrying the first encoded information block, wherein the transmitting the second encoded information block includes transmitting a second signal carrying the second encoded information block. In some embodiments, the method further comprises transmitting, by the wireless communication device, a third encoded information block including the one or more known bits.

Further embodiments of the present disclosure include a method of wireless communication, comprising: receiving, by a user equipment (UE) from a first base station of a first cell in a handover message, non-multicast broadcast single frequency network (non-MBSFN) subframe configuration information for a second cell, wherein the handover message corresponds to a handover between the first cell and the second cell; receiving, by the UE from a second base station of the second cell, one or more reference signals in one or more subframes based on the received configuration information; and performing, by the UE, channel estimation based on the one or more received reference signals and the received non-MBSFN subframe configuration information.

In some embodiments, wherein the non-MBSFN configuration information indicates a correlation between the configuration of the first cell and the configuration of the second cell during the handover. In some embodiments, wherein the correlation indicates that one or more bits of an information block of the first cell and an information block of the second cell are the same, and wherein the one or more bits are used for decoding encoded information blocks of the second cell.

Further embodiments of the present disclosure include a wireless communication device, comprising a receiver configured to: receive, by a wireless communication device, one or more known bits; receive, by the wireless communication device, a first encoded information block; a processor in communication with the receiver and configured to decode the first encoded information block to generate a first information block based on the one or more known bits.

In some embodiments, wherein the receiver is further configured to receive a second encoded information block; and wherein the processor is further configured to: decode the second encoded information block to generate a second information block; and extract the one or more known bits from the second information block. In some embodiments, wherein the receiver is further configured to receive the one or more known bits from a first base station of a first cell, wherein the one or more known bits are associated with a second cell. In some embodiments, wherein the receiver is further configured to receive a second encoded information block from a second base station of the second cell; and wherein the processor is further configured to decode the second encoded information block based on the one or more known bits associated with the second cell. In some embodiments, wherein the receiver is further configured to receive the one or more known bits in a handover message, wherein the handover message corresponds to a handover between the first cell and the second cell. In some embodiments, wherein the second encoded information block is associated with at least one of a physical broadcast channel (PBCH), a system information block (SIB), a physical downlink control channel (PDCCH), a physical downlink shared channel (PDSCH), a physical uplink control channel (PDCCH), or a physical uplink shared channel (PDSCH).

Further embodiments of the present disclosure include a wireless communication device, comprising a transceiver configured to receive a first encoded information block and a second encoded information block, wherein the first encoded information block is based on an even system frame number (SFN) and the second encoded information block is based on an odd SFN; a processor configured to jointly decode the first encoded information block and the second encoded information block.

In some embodiments, wherein the transceiver is coupled to a physical broadcast channel to receive the first encoded information block and the second encoded block.

Further embodiments of the present disclosure include a wireless communication device, comprising a processor configured to generate a first information block including one or more known bits; wherein the processor is further configured to encode the first information block to form a first encoded information block; and a transceiver configured to transmit the first encoded information block to a second wireless communication device such that the second wireless communication device is configured to decode the first encoded information block based on the one or more known bits.

In some embodiments, wherein the transceiver is further configured to transmit a second encoded information block to the second wireless communication device such that the second wireless communication device is configured to extract the one or more know bits from the second encoded information block.

Further embodiments of the present disclosure include a wireless communication device comprising a transceiver configured to receive from a first base station of a first cell in a handover message, non-multicast broadcast single frequency network (non-MBSFN) subframe configuration information for a second cell, wherein the handover message corresponds to a handover between the first and the second cells; wherein the transceiver is further configured to receive one or more reference signals in one or more subframes based on the received configuration information from the second cell; and a processor configure to perform channel estimation with a second station of the second cell, based on the received reference signals.

In some embodiments, wherein the non-MBSFN configuration information indicates a correlation between the configuration of the first cell and the configuration of the second cell during the handover. In some embodiments, wherein the correlation indicates that one or more bits of an information block of the first cell and an information block of the second cell are the same, and wherein the processor is further configured to use the one or more bits for decoding encoded information blocks of the second cell.

Further embodiments of the present disclosure include a wireless communication device, comprising means (e.g., the transceiver 210 and antenna 216) for receiving one or more known bits; means for receiving a first encoded information block; and means (e.g., the processor 202) for decoding the first encoded information block to generate a first information block based on the one or more known bits.

In some embodiments, wherein the receiving the one or more known bits includes: means for receiving a second encoded information block; means for decoding the second encoded information block to generate a second information block; and means for extracting the one or more known bits from the second information block. In some embodiments, wherein the means for receiving the one or more known bits includes: means for receiving the one or more known bits from a first base station of a first cell, wherein the one or more known bits are associated with a second cell. In some embodiments, the wireless communication device further comprising means for receiving, from a second base station of the second cell, a second encoded information block; and means for decoding the second encoded information block based on the one or more known bits associated with the second cell of claim 40, wherein the means for receiving the one or more known bits includes means for receiving a handover message, wherein the handover message corresponds to a handover between the first cell and the second cell.

Further embodiments of the present disclosure include a wireless communication device, comprising means (e.g., the transceiver 210 and antenna 216) for receiving a first encoded information block and a second encoded information block, wherein the first encoded information block is based on an even system frame number (SFN) and the second encoded information block is based on an odd SFN; and means (e.g., the processor 202) for jointly decoding the first encoded information block and the second encoded information block.

In some embodiments, the wireless communication device further comprises means for receiving a third encoded information block based on an even SFN and a fourth encoded information block based on an odd SFN; and means for jointly decoding the third encoded information block and the fourth encoded information block.

Further embodiments of the present disclosure include a wireless communication device, comprising means (e.g., the processor 302) for generating a first information block including one or more known bits; means (e.g., the processor 302) for encoding the first information block to form a first encoded information block; and means (e.g., the transceiver 310 and antenna 316) for transmitting the first encoded information block to a second wireless communication device such that the second wireless communication device is configured to decode the first encoded information block based on the one or more known bits.

Further embodiments of the present disclosure include a wireless communication device, comprising means (e.g., the transceiver 210 and antenna 216) for receiving, from a first base station of a first cell in a handover message, non-multicast broadcast single frequency network (non-MBSFN) subframe configuration information for a second cell, wherein the handover message corresponds to a handover between the first cell and the second cell; means for receiving, from a second base station of the second cell, one or more reference signals in one or more subframes based on the received configuration information; and means (e.g., the processor 202) for performing channel estimation based on the one or more received reference signals and the received non-MBSFN subframe configuration information.

Further embodiments of the present disclosure include a non-transitory computer-readable medium having program code recorded thereon, the program code comprising code for causing a first wireless communication device to receive one or more known bits; code for causing the first wireless communication device to receive a first encoded information block; and code for causing the first wireless communication device to decode the first encoded information block to generate a first information block based on the one or more known bits.

In some embodiments, wherein the code for causing the first wireless communication device to receive the one or more known bits includes code for causing the first wireless communication device to receive a second encoded information block; code for causing the first wireless communication device to decode the second encoded information block to generate a second information block; and code for causing the first wireless communication device to extract the one or more known bits from the second information block. In some embodiments, wherein the code for causing the first wireless communication device to receive the one or more known bits includes code for causing the first wireless communication device to receive the one or more known bits from a first base station of a first cell, wherein the one or more known bits are associated with a second cell. In some embodiments, the program code further comprising code for causing the first wireless communication device to receive, from a second base station of the second cell, a second encoded information block; and code for causing the first wireless communication device to decode the second encoded information block based on the one or more known bits associated with the second cell. In some embodiments, wherein the code for causing the first wireless communication device to receive the one or more known bits includes code for causing the first wireless communication device to receive a handover message, wherein the handover message corresponds to a handover between the first cell and the second cell.

Further embodiments of the present disclosure include a non-transitory computer-readable medium having program code recorded thereon, the program code comprising code for causing a first wireless communication device to receive a first encoded information block and a second encoded information block, wherein the first encoded information block is based on an even system frame number (SFN) and the second encoded information block is based on an odd SFN; and code for causing the first wireless communication device to jointly decode the first encoded information block and the second encoded information block.

In some embodiments, the program code further comprising code for causing the first wireless communication device to receive a third encoded information block based on an even SFN and a fourth encoded information block based on an odd SFN; and code for causing the first wireless communication device to jointly decode the third encoded information block and the fourth encoded information block.

Further embodiments of the present disclosure include a non-transitory computer-readable medium having program code recorded thereon, the program code comprising code for causing a first wireless communication device to generate a first information block including one or more known bits; code for causing the first wireless communication device to encode the first information block to form a first encoded information block; and code for causing the first wireless communication device to transmit the first encoded information block to a second wireless communication device such that the second wireless communication device is configured to decode the first encoded information block based on the one or more known bits.

Further embodiments of the present disclosure include a non-transitory computer-readable medium having program code recorded thereon, the program code comprising code for causing a first wireless communication device to receive, from a first base station of a first cell in a handover message, non-multicast broadcast single frequency network (non-MBSFN) subframe configuration information for a second cell, wherein the handover message corresponds to a handover between the first cell and the second cell; code for causing the first wireless communication device to receive, from a second base station of the second cell, one or more reference signals in one or more subframes based on the received configuration information; and code for causing the first wireless communication device to perform channel estimation based on the one or more received reference signals and the received non-MBSFN subframe configuration information.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
receiving, by a wireless communication device, a first signal carrying a first encoded information block including a first bit pattern associated with an information field;
receiving, by the wireless communication device, a second signal carrying a second encoded information block including a second bit pattern associated with the information field;
determining, by the wireless communication device, a probability of occurrence for each bit-change pattern in a subset of a plurality of bit-change patterns associated with the information field;
selecting, by the wireless communication device, one or more bit-change patterns from the subset of the plurality of bit-change patterns based on the one or more bit-change patterns having a higher probability of occurrence among the subset of the plurality of bit-change patterns than remaining bit-change patterns in the plurality of bit-change patterns;
determining, by the wireless communication device from the first signal, a first estimate for the first encoded information block;
determining, by the wireless communication device from the second signal, a second estimate for the second encoded information block; and
jointly decoding, by the wireless communication device, the first encoded information block and the second encoded information block based on the first estimate, the second estimate, and an assumption that a difference between the first bit pattern and the second bit pattern corresponds to the one or more bit-change patterns.

2. The method of claim 1, further comprising:
selecting, by the wireless communication device, the subset of the plurality of bit-change patterns from the plurality of bit-change patterns based on a capability of the wireless communication device.

3. The method of claim 1, wherein the plurality of bit-change patterns is associated with a system frame number (SFN), wherein the jointly decoding is based on the first encoded information block including an even SFN and the second encoded information block including an odd SFN, and wherein the subset of the plurality of bit-change patterns corresponds to one of the plurality of bit-change patterns indicating a single bit-change at a least significant bit.

4. The method of claim 1, further comprising:
receiving, by the wireless communication device, a third encoded information block; and
jointly decoding, by the wireless communication device, the second encoded information block and the third encoded information block based on the second encoded information block including an even SFN and the third encoded information block including an odd SFN.

5. The method of claim 1, wherein the receiving the first encoded information block includes receiving the first encoded information block from a physical broadcast channel during a first time period, wherein the receiving the second encoded information block includes receiving the second encoded information block from the physical broadcast channel during a second time period after the first time period, and wherein the first encoded information block is generated by encoding a first information block and the second encoded information block is generated by encoding a second information block.

6. The method of claim 1, wherein the determining the first estimate and the second estimate includes:
demodulating the first signal to produce a first plurality of log-likelihood ratios (LLRs);
demodulating the second signal to produce a second plurality of LLRs; and
jointly decoding the first plurality of LLRs and the second plurality of LLRs to generate the first estimate and the second estimate based on each bit-change pattern in the subset of the plurality of bit-change patterns.

7. The method of claim 6, wherein the jointly decoding the first plurality of LLRs and the second plurality of LLRs includes:
encoding a first bit-change pattern in the subset of the plurality of bit-change patterns based on a linear block code associated with the first encoded information block and the second encoded information block;
modifying the first plurality of LLRs based on the encoded first bit-change pattern; and
combining the first plurality of LLRs with the second plurality of LLRs.

8. The method of claim 1, wherein the jointly decoding is further based on the first and second encoded information blocks having a common information type and the difference between the first bit pattern and the second bit pattern being within the subset of the plurality of bit-change patterns.

9. An apparatus comprising:
a transceiver configured to:
receive a first signal carrying a first encoded information block including a first bit pattern associated with an information field; and
receive a second signal carrying a second encoded information block including a second bit pattern associated with the information field; and
a processor configured to:
determine a probability of occurrence for each bit-change pattern in a subset of a plurality of bit-change patterns associated with the information field;
select one or more bit-change patterns from the subset of the plurality of bit-change patterns based on the one or more bit-change patterns having a higher probability of occurrence among the subset of the plurality of bit-change patterns than remaining bit-change patterns in the plurality of bit-change patterns;
determine, by the apparatus from the first signal, a first estimate for the first encoded information block;
determine, by the apparatus from the second signal, a second estimate for the second encoded information block; and
jointly decode the first encoded information block and the second encoded information block based on the first estimate, the second estimate, and an assumption that a difference between the first bit pattern and the second bit pattern corresponds to the one or more bit-change patterns.

10. The apparatus of claim 9, wherein the processor is further configured to:
select the subset of the plurality of bit-change patterns from the plurality of bit-change patterns based on a capability of the apparatus.

11. The apparatus of claim 9, wherein the plurality of bit-change patterns is associated with a system frame number (SFN), wherein the jointly decoding is based on the first encoded information block including an even SFN and the second encoded information block including an odd SFN, and wherein the subset of the plurality of bit-change patterns corresponds to one of the plurality of bit-change patterns indicating a single bit-change at a least significant bit.

12. The apparatus of claim 11, wherein the transceiver is further configured to receive a third encoded information block, and wherein the processor is further configured to jointly decode the second encoded information block and the third encoded information block based on the second encoded information block including an even SFN and the third encoded information block including an odd SFN.

13. The apparatus of claim 9, wherein the transceiver is further configured to receive the first encoded information block by receiving the first encoded information block from a physical broadcast channel during a first time period, wherein the transceiver is further configured to receive the second encoded information block by receiving the second encoded information block from the physical broadcast channel during a second time period after the first time period, and wherein the first encoded information block is generated by encoding a first information block and the second encoded information block is generated by encoding a second information block.

14. The apparatus of claim 9, wherein the processor is further configured to determine the first estimate and the second estimate by:
demodulating the first signal to produce a first plurality of log-likelihood ratios (LLRs);
demodulating the second signal to produce a second plurality of LLRs; and
jointly decoding the first plurality of LLRs and the second plurality of LLRs to generate the first estimate and the second estimate based on each bit-change pattern in the subset of the plurality of bit-change patterns.

15. The apparatus of claim 14, wherein the processor is further configured to jointly decode the first plurality of LLRs and the second plurality of LLRs by:
encoding a first bit-change pattern in the subset of the plurality of bit-change patterns based on a linear block code associated with the first encoded information block and the second encoded information block;
modifying the first plurality of LLRs based on the encoded first bit-change pattern; and
combining the first plurality of LLRs with the second plurality of LLRs.

16. The apparatus of claim 9, wherein the processor configured to jointly decode the first and second encoded information blocks is further configured to jointly decode the first and second encoded information blocks based on the first and second encoded information blocks.

17. A non-transitory computer-readable medium having computer-executable code recorded thereon, the computer-executable code, when executed by one or more processors at a wireless communication device, causing the wireless communication device to:
receive a first signal carrying a first encoded information block including a first bit pattern associated with an information field;
receive a second signal carrying a second encoded information block including a second bit pattern associated with the information field;
determine a probability of occurrence for each bit-change pattern in a subset of a plurality of bit-change patterns associated with the information field;
select one or more bit-change patterns from the subset of the plurality of bit-change patterns based on the one or more bit-change patterns having a higher probability of occurrence among the subset of the plurality of bit-change patterns than remaining bit-change patterns in the plurality of bit-change patterns;
determine, by the wireless communication device from the first signal, a first estimate for the first encoded information block;
determine, by the wireless communication device from the second signal, a second estimate for the second encoded information block; and
jointly decode the first encoded information block and the second encoded information block based on the first estimate, the second estimate, and an assumption that a difference between the first bit pattern and the second bit pattern corresponds to the one or more bit-change patterns.

18. The non-transitory computer-readable medium of claim 17, wherein the computer executable code, when executed by the one or more processors, further causes the wireless communication device to:
select the subset of the plurality of bit-change patterns from the plurality of bit-change patterns based on a capability of the wireless communication device.

19. The non-transitory computer-readable medium of claim 17, wherein:
the plurality of bit-change patterns is associated with a system frame number (SFN), the computer-executable code that causes the wireless communication device to jointly decode the first encoded information block and the second encoded information block includes computer-executable code that causes the wireless communication device to jointly decode the first encoded information block and the second encoded information block based on the first encoded information block including an even SFN and the second encoded information block including an odd SFN, and
the subset of the plurality of bit-change patterns corresponds to one of the plurality of bit-change patterns indicating a single bit-change at a least significant bit.

20. The non-transitory computer-readable medium of claim 17, wherein the computer executable code, when executed by the one or more processors, further causes the wireless communication device to:
receive a third encoded information block; and
jointly decode the second encoded information block and the third encoded information block based on the second encoded information block including an even SFN and the third encoded information block including an odd SFN.

21. The non-transitory computer-readable medium of claim 17, wherein:
the computer executable code, when executed by the one or more processors, further causes the wireless communication device to:
receive the first encoded information block comprises code for causing the wireless communication device to receive the first encoded information block from a physical broadcast channel during a first time period; and receive the second encoded information block comprises code for causing the wireless communication device to receive the second encoded information block from the physical broadcast channel during a second time period after the first time period; and the first encoded information block is generated by encoding a first information block and the second encoded information block is generated by encoding a second information block.

22. The non-transitory computer-readable medium of claim 17, wherein the computer-executable code that causes the wireless communication device to determine the first estimate and the second estimate comprises:
   computer-executable code that causes the wireless communication device to demodulate the first signal to produce a first plurality of log-likelihood ratios (LLRs);
   computer-executable code that causes the wireless communication device to demodulate the second signal to produce a second plurality of LLRs; and
   computer-executable code that causes the wireless communication device to jointly decode the first plurality of LLRs and the second plurality of LLRs to generate the first estimate and the second estimate based on each bit-change pattern in the subset of the plurality of bit-change patterns.

23. The non-transitory computer-readable medium of claim 22, wherein the computer-executable code that causes the wireless communication device to jointly decode the first plurality of LLRs and the second plurality of LLRs comprises computer-executable code that causes the wireless communication device to:
   encode a first bit-change pattern in the subset of the plurality of bit-change patterns based on a linear block code associated with the first encoded information block and the second encoded information block;
   modify the first plurality of LLRs based on the encoded first bit-change pattern; and
   combine the first plurality of LLRs with the second plurality of LLRs.

24. The non-transitory computer-readable medium of claim 17, wherein the computer-executable code that causes the wireless communication device to jointly decode the first and second encoded information blocks comprises computer-executable code that causes the wireless communication device to:
   jointly decode the first and second encoded information blocks based on the first and second encoded information blocks having a common information type and the difference between the first bit pattern and the second bit pattern being within the subset of the plurality of bit-change patterns.

25. A wireless communication device, comprising:
   means for receiving a first signal carrying a first encoded information block including a first bit pattern associated with an information field;
   means for receiving a second signal carrying a second encoded information block including a second bit pattern associated with the information field;
   means for determining a probability of occurrence for each bit-change pattern in a subset of a plurality of bit-change patterns associated with the information field;
   means for selecting one or more bit-change patterns from the subset of the plurality of bit-change patterns based on the one or more bit-change patterns having a higher probability of occurrence among the subset of the plurality of bit-change patterns than remaining bit-change patterns in the plurality of bit-change patterns;
   means for determining, by the wireless communication device from the first signal, a first estimate for the first encoded information block;
   means for determining, by the wireless communication device from the second signal, a second estimate for the second encoded information block; and
   means for jointly decoding the first encoded information block and the second encoded information block based on the first estimate, the second estimate, and an assumption that a difference between the first bit pattern and the second bit pattern corresponds to the one or more bit-change patterns.

26. The wireless communication device of claim 25, further comprising:
   means for selecting the subset of the plurality of bit-change patterns from the plurality of bit-change patterns based on a capability of the wireless communication device.

27. The wireless communication device of claim 25, wherein:
   the plurality of bit-change patterns is associated with a system frame number (SFN),
   the means for jointly decoding the first and second encoded information blocks includes means for decoding the first and second encoded information blocks based on the first encoded information block including an even SFN and the second encoded information block including an odd SFN, and
   the subset of the plurality of bit-change patterns corresponds to one of the plurality of bit-change patterns indicating a single bit-change at a least significant bit.

28. The wireless communication device of claim 25, further comprising:
   means for receiving a third encoded information block; and
   means for jointly decoding the second encoded information block and the third encoded information block based on the second encoded information block including an even SFN and the third encoded information block including an odd SFN.

29. The wireless communication device of claim 25, wherein:
   the means for receiving the first encoded information block includes means for receiving the first encoded information block from a physical broadcast channel during a first time period,
   the means for receiving the second encoded information block includes means for receiving the second encoded information block from the physical broadcast channel during a second time period after the first time period, and
   the first encoded information block is generated by encoding a first information block and the second encoded information block is generated by encoding a second information block.

30. The wireless communication device of claim 25, wherein the means for determining the first estimate and the second estimate includes:
   means for demodulating the first signal to produce a first plurality of log-likelihood ratios (LLRs);
   means for demodulating the second signal to produce a second plurality of LLRs; and
   means jointly decoding the first plurality of LLRs and the second plurality of LLRs to generate the first estimate and the second estimate based on each bit-change pattern in the subset of the plurality of bit-change patterns.

31. The wireless communication device of claim 30, wherein the means for jointly decoding the first plurality of LLRs and the second plurality of LLRs includes:
means for encoding a first bit-change pattern in the subset of the plurality of bit-change patterns based on a linear block code associated with the first encoded information block and the second encoded information block;
means for modifying the first plurality of LLRs based on the encoded first bit-change pattern; and
means for combining the first plurality of LLRs with the second plurality of LLRs.

32. The wireless communication device of claim 25, wherein the means for jointly decoding the first and second encoded information blocks includes means for jointly decoding the first and second encoded information blocks based on the first and second encoded information blocks having a common information type and the difference between the first bit pattern and the second bit pattern being within the subset of the plurality of bit-change patterns.

* * * * *